United States Patent
Albert et al.

(10) Patent No.: US 12,450,615 B2
(45) Date of Patent: Oct. 21, 2025

(54) METHOD, TERMINAL, AND COIN REGISTER FOR TRANSMITTING ELECTRONIC COIN DATA SETS

(71) Applicant: GIESECKE+DEVRIENT ADVANCE52 GMBH, Munich (DE)

(72) Inventors: Daniel Albert, Munich (DE); Raoul-Thomas Herborg, Worthsee (DE)

(73) Assignee: GIESECKE+DEVRIENT ADVANCE52 GMBH, Munich (DE)

( * ) Notice: Subject to any disclaimer, the term of this patent is extended or adjusted under 35 U.S.C. 154(b) by 243 days.

(21) Appl. No.: 18/014,654

(22) PCT Filed: Jun. 30, 2021

(86) PCT No.: PCT/EP2021/068063
§ 371 (c)(1),
(2) Date: Jan. 5, 2023

(87) PCT Pub. No.: WO2022/008321
PCT Pub. Date: Jan. 13, 2022

(65) Prior Publication Data
US 2023/0222509 A1    Jul. 13, 2023

(30) Foreign Application Priority Data
Jul. 8, 2020  (DE) ............... 10 2020 004 117.5

(51) Int. Cl.
G06Q 20/42  (2012.01)
G06Q 20/06  (2012.01)
G06Q 20/40  (2012.01)

(52) U.S. Cl.
CPC ........... *G06Q 20/42* (2013.01); *G06Q 20/065* (2013.01); *G06Q 20/40975* (2013.01)

(58) Field of Classification Search
CPC . G06Q 20/42; G06Q 20/065; G06Q 20/40975
(Continued)

(56) References Cited

U.S. PATENT DOCUMENTS 10,262,321 B1 * 4/2019 Ramanathan ...... G06Q 20/3829
2014/0074719 A1 * 3/2014 Gressel ................. G06Q 30/06
713/168

(Continued)

FOREIGN PATENT DOCUMENTS

DE     102018009951 A1   6/2020
WO       2012122994 A1   9/2012

OTHER PUBLICATIONS

International Search Report from corresponding PCT Application No. PCT/EP2021/068063, Oct. 18, 2021.

*Primary Examiner* — Bennett M Sigmond
*Assistant Examiner* — Michael J Warden
(74) *Attorney, Agent, or Firm* — Workman Nydegger

(57) ABSTRACT

A first security element is for transmitting an electronic coin data set to a second security element. The electronic coin data set is registered in a coin register of a payment system. The method has the steps of: setting a status of the electronic coin data set from the security element to an inactive status; transmitting the electronic coin data set from the first security element to the second security element; checking whether a receipt confirmation from the second security element has been received in the first security element; and deleting the transmitted electronic coin data set if the checking step results in that the receipt confirmation has been obtained by the first security element. The aforementioned relates to a payment system, a coin register, a security element, and a terminal for transmitting electronic coin data sets.

19 Claims, 13 Drawing Sheets

(58) Field of Classification Search
USPC .......................................................... 705/44
See application file for complete search history.

(56) References Cited

U.S. PATENT DOCUMENTS

| | | | |
|---|---|---|---|
| 2016/0358165 A1* | 12/2016 | Maxwell | H04L 9/50 |
| 2017/0132630 A1* | 5/2017 | Castinado | G06F 16/2255 |
| 2017/0236094 A1* | 8/2017 | Shah | H04L 9/3236 |
| | | | 705/300 |
| 2018/0183594 A1 | 6/2018 | Palanisamy | |
| 2018/0241546 A1* | 8/2018 | Leng | G06Q 20/02 |
| 2019/0228386 A1* | 7/2019 | Onnainty | H04L 9/3239 |
| 2019/0253235 A1* | 8/2019 | Zhang | H04L 9/3247 |
| 2022/0141312 A1* | 5/2022 | Cao | H04L 67/55 |
| | | | 709/228 |

\* cited by examiner

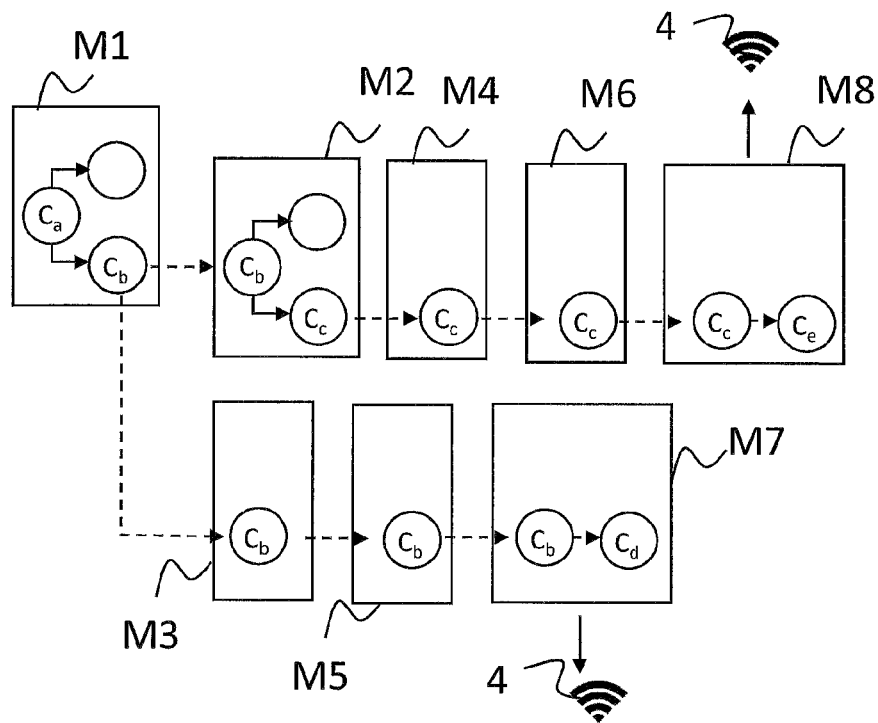
Fig. 1a – State of the art
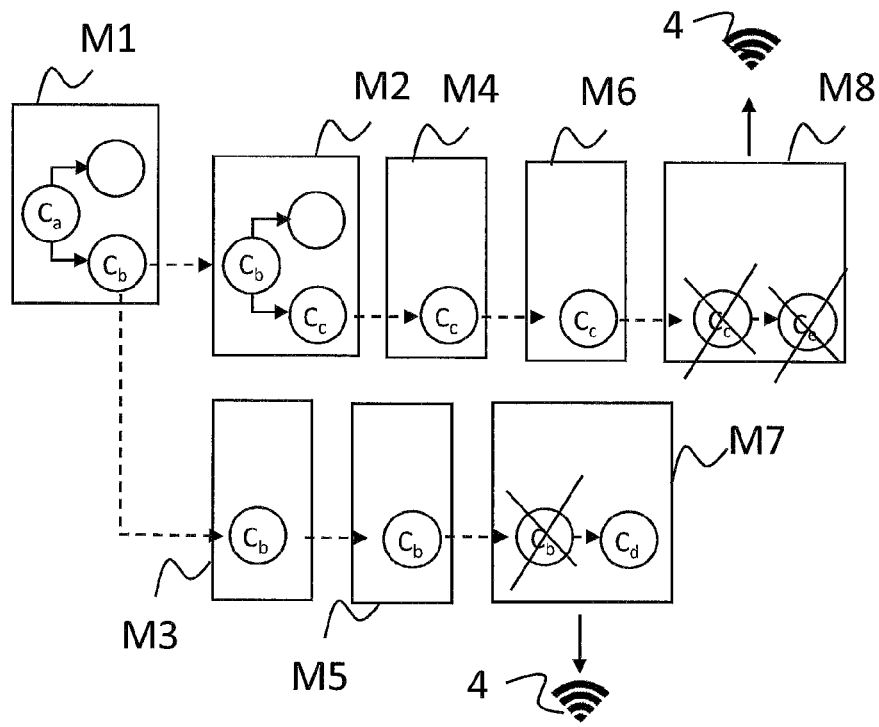
Fig. 1b – State of the art

4

| command | $O_1$ | $O_2$ | $S_1$ | $S_2$ | Sig. | O-Flag | C-Flag | R-Flag | S-Flag | status |
|---|---|---|---|---|---|---|---|---|---|---|
| create | - | - | $Z_i$ | - | $[Z_i]Sig_l$ | - | - | - | [0,1] | [0,1] |
| return | $Z_i$ | - | - | - | $[Z_i]Sig_l$ | [0,1] | - | - | [0,1] | [0,1] |
| split | $Z_i$ | - | $Z_j$ | $Z_k$ |  | [0,1] | [0,1] | [0,1] | [0,1] | [0,1] |
| merge | $Z_i$ | $Z_j$ | - | $Z_m$ |  | [0,1] | [0,1] | [0,1] | [0,1] | [0,1] |
| switch | $Z_k$ | - | - | $Z_l$ |  | [0,1] | [0,1] | [0,1] | [0,1] | [0,1] |

Fig. 7

METHOD, TERMINAL, AND COIN REGISTER FOR TRANSMITTING ELECTRONIC COIN DATA SETS

TECHNICAL FIELD OF THE INVENTION

The invention relates to a method in a first security element for transmitting electronic coin data sets as well as a terminal with a security element as well as a payment system and a coin register of a payment system.

TECHNICAL BACKGROUND OF THE INVENTION

Security of payment transactions and associated payment transaction data means both protection of the confidentiality of the exchanged data; as well as protection of the integrity of the exchanged data; as well as protection of the availability of the exchanged data.

For electronic coin data sets, it must be possible to demonstrate basic control functions, in particular (1) the detection of multiple spending procedures, also called double spending, and (2) the detection of uncovered payments. In the event (1) someone tries to spend the same coin data set multiple times and in the event (2) someone tries to spend a coin data set even though they do not have credit (any more) or do not have this coin data set.

To illustrate case (1), FIG. 1$a$ and FIG. 1$b$ show a payment system in which it is possible to exchange a monetary amount in the form of electronic coin data sets directly between terminals in the payment system. In the case of direct transmission, no central entity of the payment system, such as a coin register, is involved. In FIG. 1$a$, a terminal M1 splits a coin data set $C_a$ to obtain a coin part data set $C_b$. The terminal M1 illicitly shares the coin data set $C_b$ with terminals M2 and M3 simultaneously.

In the payment system of FIG. 1$a$, the terminal M2 shares the coin data set $C_b$ and receives the coin data set $C_c$, which is then shared directly with the terminal M4. Terminal M4 passes the coin data set $C_c$ directly to terminal M6. The terminal M6 passes the coin data set $C_c$ directly to the terminal M8. The unsuspecting subscriber with terminal M3 passes the coin data subset $C_b$ directly to terminal M5. Terminal M3 passes the coin data set $C_b$ directly to terminal M5. Terminal M5 passes the coin data set $C_b$ directly to terminal M7. Thus, both coin data sets $C_b$ and $C_c$ change hands frequently without a coin register of the payment system being aware of this.

When—as shown in FIG. 1$b$—the terminal M7 has the coin data set $C_b$ registered to it in a coin register 4 of the payment system (=switching), the coin data set $C_b$ becomes invalid (shown by crossing out the coin data set) and a coin data set $C_d$ becomes valid. When the terminal M8 now also wants to register the coin data set $C_c$ as the coin data set $C_e$ with the coin register 4, the coin register 4 detects that the coin data set $C_b$ is already invalid. The attack by M1 is only now detected. As a result, the coin register 4 accepts neither the coin data set $C_c$ nor the coin data set $C_e$.

In addition, due to the large number of transactions of an electronic coin data set and also due to the advancing life span, the risk of manipulation(s) being carried out on the electronic coin data set increases.

In the future, it should be possible to dispense with cash (banknotes and analogue coins) altogether, or at least with analogue coins.

A valid electronic coin data set may—as a system prerequisite—exist only once, i.e. only at one single location. This system prerequisite increases the requirements for a transmission process, especially in order to successfully ward off attacks during a transmission, or to prevent possible transmission errors from being exploited for manipulation of the payment system. This system prerequisite is complicated by the fact that the technical transmission should be able to take place between two subscribers of the payment system with intermediate entities or devices or remote data storage devices, so as not to reduce the degree of flexibility in payment.

It is therefore the task of the present invention to create a method and a system in which a payment transaction between subscribers in a payment system is designed to be secure but nevertheless simple. In particular, a direct and anonymous payment between devices, tokens, smartphones, security elements, machines, cash terminals or vending machines is to be created. Several coin data sets should be able to be combined and/or divided at the subscriber (=user) as desired in order to enable flexible exchange. The exchanged coin data sets shall be confidential to other system subscribers, but allow each system subscriber to perform basic checks on the coin data set, namely (1) detecting multiple spend attempts; (2) detecting attempts to pay with non-existent monetary amounts; and (3) detecting return criteria for coin data sets that have already been spent, for example that a coin data set should expire.

In particular, to create a tamper-proof transaction protocol for transmitting the electronic coin data set.

SUMMARY OF THE INVENTION

The task is solved in particular by a method in a first security element for transmitting an electronic coin data set to a second security element, wherein the electronic coin data set is registered in a coin register of a payment system with the method steps: setting a status of the electronic coin data set from the first security element to an inactive status; sending the electronic coin data set from the first security element to the second security element; checking whether a receipt confirmation has been received from the second security element in the first security element; and deleting the sent electronic coin data set when the checking step determines that the receipt confirmation has been received from the first security element.

An electronic coin data set is in particular an electronic data set that represents an amount of money (=monetary) and is also colloquially referred to as a "digital coin" or "electronic coin", English "digital/electronic coin". This monetary amount changes from a first security element to a second security element in the method. In the following, a monetary amount is understood as a digital amount that can be credited to an account of a financial institution, for example, or can be exchanged for another means of payment. An electronic coin data set represents cash in electronic form.

An electronic coin data set for transmitting monetary amounts differs substantially from an electronic data set for data exchange or data transmission, since, for example, a classic data transaction takes place on the basis of a question-answer principle or on an intercommunication between the data transmission partners. An electronic coin data set, on the other hand, is unique and stands in the context of a security concept, which can, for example, include masking, signatures, verification values or encryption. In principle, an electronic coin data set contains all the data required for a receiving entity with regard to verification, authentication and forwarding to other entities. Intercommunication between the terminals during exchange is therefore not provided in principle for this type of data set.

In contrast to copying, i.e. the duplication of digital data, a valid electronic coin data set may only exist once in the payment system. This system prerequisite must be observed in particular when transmitting electronic coin data sets in order to prevent multiple spending.

The electronic coin data set can be set to an active status and/or an inactive status. The inactive status invalidates the respective electronic coin data set for further actions. The active status validates the respective electronic coin data set for further actions. The electronic coin data set, i.e. in particular a monetary amount and an obfuscation amount, remains unchanged by a conversion of the status. For example, the status is maintained or logged in a data memory of the security element for each electronic coin data set. The inactive status provides a flag to indicate to accessing elements that the coin data set is already being used or is to be used in a transmission process. A coin data set in an inactive status cannot be used for any further action. It is therefore in the interest of each subscriber not to manage a coin data set in an inactive status for longer than absolutely necessary, as the monetary amount is blocked during the inactive status. A speedy completion of the transmission process is therefore beneficial to the subscribers in the transmission.

In order to make a transmission protocol secure, the electronic coin data sets are here managed by security elements and also transmitted through them. A security element is a technical resource-limited device. A security element is, for example, a special computer program product, in particular in the form of a secure runtime environment within an operating system of a terminal, English Trusted Execution Environments, TEE, or eSIM software, stored on a data memory, for example of a device, such as a mobile terminal, token, smartphone, machine, cash terminal, vending machine. Alternatively or additionally, the security element is, for example, a special hardware, in particular in the form of a secured hardware platform module, English Trusted Platform Module, TPM, or as a smart card or an embedded security module, such as eUICC or eSIM. The security element provides a trusted environment and thus has a higher level of trust than a device in which the security element may be operationally integrated.

The security element may securely store an electronic coin data set. The security element may also have a plurality of electronic coin data sets, for example, the plurality of electronic coin data sets may be stored in a data memory exclusively associated with a security element. The data memory then represents an electronic wallet, for example. This data memory can, for example, be an internal memory of the security element. Alternatively, and in order to increase the flexibility of the payment method, the data memory can be an external data memory, for example a data memory of the terminal (etc.) in which the security element is integrated ready for operation, if applicable. If applicable, only one respective security element has exclusive access rights to this external data memory. The external data memory can also be a remote data memory (cloud memory). The data memory can be virtual.

The transmission of an electronic coin data set takes place between the two security elements. The logical transmission of the electronic coin data set is direct, whereas a physical transmission may be via one or more intermediate entities, for example one or more terminals to produce the operational readiness of the security element(s) and/or a remote data storage service where the wallet containing the electronic coin data sets is stored.

Security elements can transmit electronic coin data sets between each other and then use them directly—without verification by a central entity of the payment system. A system requirement could be that electronic coin data sets received by a security element are per se considered secure/valid.

The first security element may have received an electronic coin data set from a less trusted entity, such as a terminal or machine or online service, as a subscriber in the payment system. For example, an import function of the security element is provided for this purpose. Electronic coin data sets from such an insecure origin, in particular not directly from another security element, are considered insecure and, upon receipt, are checked for validity in the security element using a central entity of the payment system, for example a remote coin register. In one embodiment, such insecure electronic coin data sets are registered to the first security element by an action such as switching, combining, splitting, before they are (allowed to be) transmitted to the second security element.

Only—and exclusively—for the sending step a copy of the (inactivated) electronic coin data set is created and this copy is sent to the second security element.

The electronic coin data set to be transmitted is registered in a coin register, i.e. a remote entity, of the payment system. This provides, for example, for the establishment of a communication link to the coin register in order to register the electronic coin data set. This communication link does not necessarily have to be present during the transmission process (payment process). The coin register is adapted, for example, as a superordinate central entity of the payment system. The coin register is therefore not necessarily assembled on the same level (=layer) of the security elements. Preferably, the coin register is provided for managing and checking masked electronic coin data sets. It is conceivable that the coin register additionally manages and checks further transactions between devices.

For example, the coin register is a database. This database makes it possible in a simple way to check coin data sets with regard to their validity and to prevent "double spending", i.e. multiple spending, without the transmitting itself being registered or logged. The database describes a technique for networked computers to agree on the sequence of determined transactions and that these transactions update data.

The coin register may be a decentrally controlled data base, English Distributed Ledger Technology, DLT, in which the masked electronic coin data sets are registered with corresponding processing of the masked electronic coin data set. In a preferred embodiment, a status or validity of the (masked) electronic coin data set can be derived therefrom. Preferably, the status or validity of the (masked) electronic coin data set is noted in and by the coin register. The registration of the processing or processing steps may also concern the registration of checking results and intermediate checking results concerning the status or validity of an electronic coin data set, in particular the determination of checking values and counter values of corresponding coin data sets. If a processing is final, this is indicated, for example, by corresponding flag or a derived overall flag in the coin register. Final processing then determines whether an electronic coin data set is valid or invalid.

The coin register is preferably a centrally maintained database, for example in the form of an accessible data memory. For example, the coin register is a service server of the payment system.

In the method, after sending the electronic coin data set from the first security element to the second security element, a check is made to see if a receipt confirmation has been received from the second security element in the first security element. This checking serves as a follow-up in the first security element whether the sending step was successful and was acknowledged accordingly by the second security element. This receipt confirmation is mandatory in order to delete the sent electronic coin data set in a subsequent step. With the receipt confirmation, which corresponds to a deletion request from the second security element, the electronic coin data set is deleted in the first security element. Preferably, the first security element could be blocked from transmitting further coin data sets until the deletion step is performed and confirmed.

In one embodiment, it is provided that the deleted electronic coin data set remains archived in the security element. The fact that the deleted electronic coin data set is no longer valid or is returned can be flagged (=characterised), for example, with the aid of a flag, a status or other coding. Alternatively and preferably, the electronic coin data set to be deleted is destroyed and, if necessary, also physically removed from the security element.

This method ensures that only inactive electronic coin data sets are copied that are still being used in the first security element after being sent to the second security element. Duplication of an active electronic coin data set is thus prevented by the transmission protocol. By using security elements, a secure environment for such a transmission is guaranteed, thus "double-spending" is not possible. Checking also ensures in the first security element that a send was successful and that the electronic coin data set in the first security element can be deleted without destroying monetary amounts.

In the chosen (offline) transmission environment, it is particularly important that transmission errors or transmission conflicts can be resolved without the need for central entity(ies) of a payment system, such as the coin register. The transmission protocol proposed here ensures that a transmission process (payment process), although executed asynchronously, is trustworthy by checking for the presence of a receipt confirmation and using security elements. The transmission proposed here, namely invalidating, sending, checking and then deleting, ensures that monetary amounts are not destroyed and that no duplicates can be created in the active state.

In a preferred embodiment, the security element is inserted into a device ready for operation. The device can contain an application through which a user (=subscriber) controls a payment process and accesses electronic coin data sets of the security element in this payment process. A transmission (i.e. also the sending) of the electronic coin data set between the first and the second security element may be integrated in an existing transmission between two devices and/or may be integrated in a secure channel between two applications of the respective devices. In addition, the transmission may involve an internet data connection to an external data memory, such as an online memory.

For example, the device may be a mobile terminal, such as a smartphone, a tablet computer, a computer, a server, a vending machine or a machine. A transmission of the electronic coin data set from the (first) security element of a first device takes place, for example, to the (second) security element of another device. A device-to-device transmission path can be set up, via which, for example, a secure channel is set up between the two security elements, via which the electronic coin data set is then transmitted. An application (installed) ready for use on the device can initiate and control the transmission of the coin data set by using input and/or output means of the respective device. For example, amounts of electronic coin data sets can be indicated and the transmission procedure can be monitored.

In particular, a device is considered to be a mobile telecommunication terminal, for example a smartphone. Alternatively or additionally, the device may also be a wearable, a machine, a tool, a vending machine or even a container or vehicle. A device is thus either stationary or mobile. The device is preferably adapted to use the internet and/or other public or private networks. For this purpose, the device uses a suitable connection technology, for example Bluetooth, LoRa, NFC and/or WiFi, and has at least one corresponding interface. The device may also be adapted to be connected to the internet and/or other networks via access to a mobile network.

For example, two devices produce a local wireless communication link. The wireless communication link—with its corresponding protocol—is used to transmit between the two security elements.

In a preferred embodiment, the first security element sets the status of the electronic coin data set to an inactive status immediately before or after the sending step. This shortens the amount of time that a coin data set is inactive, thereby preventing the monetary amount from being blocked for long periods of time due to its invalidity.

In a preferred embodiment, the electronic coin data set is sent cryptographically secured. Mutual authentication of the security elements and/or encrypted transmission of the coin data set between the first and second security elements is applied. A key exchange is either negotiated as a session key or issued in advance. This increases the security when transmitting the coin data set and makes attacks on the transmission channel to intercept the coin data set more difficult, e.g. "man-in-the-middle" or "relay" attacks.

In a preferred embodiment, a transaction data set relating to the sent electronic coin data set is stored in the first security element, preferably non-volatile. For example, the storage is local to the security element. In the event of a faulty transmission, the transaction data set can be used to reconstruct the transmission process and retry it if necessary. No changes have to be made to the electronic coin data set itself; in particular, an inactive status flagging of the coin data set furthermore indicates that a sending step has already taken place, but that the coin data set has not been deleted.

The method thus provides both a rollback method (rollback) and a retry method (retry) in order to be able to rollback or retry the transmission in the event of a transmission error case in which the transmission was not completed. In the retry case, the transmission can be completed; in the rollback case, the transmission is completely undone. However, this also means that the previously sent electronic coin data set can be recovered if the retransmission fails or is unwanted. This recovery can be completed with a registration in the coin register. The recovery also makes a deletion request to the second security element to delete a coin data set that has been received but not confirmed as received. In one embodiment, the recovery does not occur until the deletion request to the second security element has been confirmed by the second security element to the first security element.

In a preferred embodiment, the transaction data set has a transaction number. This transaction number is, for example, a random number generated before the sending step. Preferably, a random number generator of the security element is used for this purpose. Alternatively or additionally, the transaction number is an identification number of the transaction that is unambiguous and unique for the transmission from the first security element to the second security element. Additionally, the transaction number may be an identification of the transaction in the payment system and this transaction number is assigned by the payment system, for example the coin register. This assignment may be done in advance or when the security element is initialised in the payment system. There can be a large number of transaction numbers that are kept similar to TAN lists.

The transaction data set also has an identifier or an address of the first security element (=sender), i.e. a date with which this security element can be uniquely identified in the payment system. The transaction data set also has an identifier or an address of the second security element (=receiver), i.e. a date with which this security element can be uniquely identified in the payment system. For example, the transaction data set has an amount of the electronic coin data set. With this transaction data set, the sending attempt can be reconstructed and, if necessary, retried or reversed.

In one embodiment, the transaction data set is transmitted together with the coin data set. The receipt confirmation can then be the retransmitted transaction data set.

In a preferred embodiment, in a transmission error case, the stored transaction data set is used to resend the electronic coin data set. It is assumed that the transmission of the electronic coin data set has failed, but the transmission process is still to be completed. The transmission of the electronic coin data set is promptly retried. The electronic coin data set to be resent is the same as the electronic coin data set that had a transmission error case during transmission. Therefore, no changes to the electronic coin data set are required for the resend. In one embodiment, another transaction data set is generated for logging purposes.

A transmission error case is assumed, for example, when a receipt confirmation has not been received in the first security element within a predefined period of time. For this purpose, a timer is started, for example. Preferably, the timer is started during the sending step of the electronic coin data set.

The transmission error case can alternatively or additionally be indicated by an error message of the first or the second security element. In this way, the error case is explicitly indicated and the decision to rollback or retry is only made on this basis.

The transmission error case can also be assumed by a detected connection fault. In this case, the error is implicitly indicated and only then the rollbacking or retry is decided.

The transmission error case can also occur due to failed authentication.

The transmission error case can also occur due to the switching off of a terminal in which one of the security elements is inserted ready for operation or due to exceeding the transmission range due to a movement of a subscriber.

The transmission error case can also occur due to an internal error in the first or second security element, in an application of the device, or in the respective device.

In a preferred embodiment, the first security element queries the second security element at predefined periodic intervals and actively requests the receipt confirmation. Alternatively, the first security element actively requests a receipt confirmation when a time value of a timer is exceeded.

In a preferred embodiment, a successful transmission is indicated in the first security element after the deletion step. A user display can be updated or the monetary amount can be deleted from a list of available monetary amounts. This indicates to a subscriber (user) in the payment system that the transmission process was successful. In addition or alternatively, an available monetary amount is updated, in particular reduced according to the transmitted monetary amount.

In a preferred embodiment, the electronic coin data set is evaluated in the indication step as an input parameter of an application of a device containing the first security element. The deleted electronic coin data set or the transaction data of this electronic coin data set thus actively controls the transmission process regardless of an application that is executably introduced on the terminal. The changes to the electronic coin data set are visualised for a user by the application on the terminal, the user thus receives prompt feedback on the validity/status/deletion of the electronic coin data set to be transmitted.

In a preferred embodiment, the first security element indicates to the second security element the deletion of the sent coin data set. This indication is to send a deletion confirmation to the second security element. This indication is also to indicate that the receipt confirmation has been received in the first security element. From the time of this indication by the first security element, the electronic coin data set can be used in the second security element and the transmission process (payment process) is considered successfully completed.

In a preferred embodiment, the first security element indicates to the coin register that the sent coin data set has been deleted. This indication is the sending of a deletion confirmation to the coin register. This indication is also to indicate that the receipt confirmation has been received in the first security element. From the moment of this indication by the first security element, the electronic coin data set can be used in the second security element and the transmission process (payment process) is considered successfully completed. The second security element obtains knowledge of this indication by querying the coin register.

In a preferred embodiment, the second security element sets the status of the electronic coin data set to an active status after the deletion step, preferably after the indication step. By setting the active status, the second security element validates the sent (or received) electronic coin data set for further actions. The electronic coin data set, i.e. in particular a monetary amount and an obfuscation amount, remains unchanged by a conversion of the status. For example, the status is maintained or logged in a local storage area of the security element for each electronic coin data set. The active status thus provides a flag to indicate to accessing entities that the electronic coin data set is not (no longer) being used in a transmission process and allows further use.

In a preferred embodiment, in a transmission error case (see above), the status of the sent electronic coin data set in the first security element is reset to an active status. By setting the active status, the first security element revalidates (reactivates) the unsuccessfully sent electronic coin data set for further actions. The electronic coin data set, i.e. in particular a monetary amount and an obfuscation amount, remain unchanged by resetting the status. This recovery can be completed with a registration in the coin register. A deletion request may also be made to the second security element prior to recovery in order to delete a coin data set in the second security element that has been received but not confirmed as received. In one embodiment, recovery only occurs when the deletion request to the second security element has been confirmed by the second security element to the first security element. Alternatively, it is also possible to set only sent coin data sets to active again, while received coin data sets cannot be activated but only deleted.

In a transmission error case, in a preferred embodiment of the method, the first security element will query a status of the sent electronic coin data set from the coin register. In the event that the sent electronic coin data set is registered to the first security element, the status of the sent coin data set in the first security element is reset (rollback) to an active status by the first security element (caused by the detected error event). Thus, the old state before the unsuccessful transmission is restored by including the coin register.

In the event that the sent electronic coin data set is not registered to the first security element, the first security element reports a transaction error to the coin register. This event is assessed as a fraud or attack scenario because, according to the first security element, the transmission has not yet been completed and therefore the coin data set cannot yet have been transmitted to another security element.

In a preferred embodiment, the second security element queries the status of the sent electronic coin data set from the coin register in a transmission error case. In the event that the sent electronic coin data set is registered to the first security element, the sent coin data set is deleted in the second security element by the first security element (rollback). This means that the old state before the unsuccessful transmission is restored by including the coin register.

In the event that the sent electronic coin data set is not registered to the first security element, the second security element reports a transaction error to the coin register. This event is assessed as a fraud or attack scenario because, according to the first security element, the transmission has not yet been completed and therefore the electronic coin data set cannot yet have been transmitted to another security element.

In a preferred embodiment, the first security element re-registers the sent coin data set in the coin register if the receipt confirmation is not received. The non-receipt is considered a transmission error case and can be detected, for example, by exceeding a predefined time period of a timer that was started, for example, when the coin data set was sent.

The task is also solved by a security element described above. The security element has a computing unit arranged to transmit electronic coin data sets according to the previously described method. The security element also has means for accessing a data memory, wherein at least one electronic coin data set is stored in the data memory. And the security element has an interface arranged for outputting the at least one electronic coin data set to another security element.

The task is further solved by a terminal with a security element described above, wherein the interface is arranged for outputting the at least one electronic coin data set to the other security element via an interface of the terminal.

The task is further solved by a method in a payment system, in particular a commercial bank or a coin register of the payment system, for managing electronic coin data sets, wherein the electronic coin data sets are issued by a central issuing entity, wherein a status exists for each electronic coin data set, wherein the status comprises the status "active" or "inactive" and, when the electronic coin data set is directly transmitted between two security elements as subscribers in the payment system, is set (flagged) to the active status or the inactive status, respectively, and is queried by a subscriber before performing actions on or with the electronic coin data set, said method comprising the step of: Determining, by the coin register based on the status of the electronic coin data set, whether the electronic coin data set is valid.

In the method in the payment system, only masked electronic coin data sets are preferably managed. Masking of the coin data sets is described later and ensures anonymity or pseudonymity in the payment system.

In a preferred embodiment, the electronic coin data set is provided for transmitting between two security elements, wherein the electronic coin data set to be transmitted is validated or invalidated by the payment system as a result of the determining, and an invalid coin data set is returned to the issuing entity or released for deletion.

In a preferred embodiment, when an action is performed on the electronic coin data set by the payment system, the status of the electronic coin data set is reset by the payment system.

The task is further accomplished by a payment system having a coin register, at least one terminal of the type described above, and an issuing entity which is adapted to create an electronic coin data set for the payment system, wherein a security element is arranged in the terminal for carrying out the method for transmitting electronic coin data sets according to the type described above.

Preferably, the payment system is also arranged to manage electronic coin data sets from further issuing entities and/or monetary amounts as book money.

The task is further solved by a coin register, wherein the coin register is arranged to register electronic coin data sets.

In an advantageous embodiment, the electronic coin data set has a monetary amount, i.e. a date representing a monetary value of the electronic coin data set, and an obfuscation amount, for example a random number. In addition, the electronic coin data set may have other metadata, such as what currency the monetary amount represents. An electronic coin data set is uniquely represented by these at least two data (monetary amount, obfuscation amount). Anyone who has access to this data of an electronic coin data set can use this electronic coin data set for payment. Knowing these two data (monetary amount, obfuscation amount) is therefore equivalent to owning the digital money. This electronic coin data set can be directly transmitted between two security elements. In one embodiment of the invention, only the transmission of the monetary amount and the obfuscation amount is necessary to exchange digital money. In one embodiment, a status (active, inactive) of the electronic coin data set is also added to the coin data set so that it then consists of three data (monetary amount, obfuscation amount, status). Alternatively, the status of a coin data set is not added to the coin data set and is only kept in the security element itself and/or the coin register.

In a preferred embodiment, a corresponding masked electronic coin data set is associated with each electronic coin data set in the method and in the payment system (the coin register). The knowledge of a masked electronic coin data set does not authorise the issuance of the digital money represented by the electronic coin data set. This represents a key difference between masked electronic coin data sets and (non-masked) electronic coin data sets. A masked electronic coin data set is unique and also uniquely associated with an electronic coin data set, so there is a 1-to-1 relationship between a masked electronic coin data set and a (non-masked) electronic coin data set. The masking of the electronic coin data set is preferably performed by a computing unit of the security element. The security element has at least one electronic coin data set. Alternatively, masking can be performed by a computing unit of a security element receiving the electronic coin data set.

In one embodiment, the masked electronic coin data set can be linked to a pseudonym to obtain a pseudonymised masked electronic coin data set. Also, to enable a possibly required mechanism for de-anonymisation, the linking step is performed before masking to link a pseudonym of the security element to the electronic coin data set. The pseudonym is preferably security element specific. A pseudonym is any type of obfuscated identity that allows the security element and the transactions performed with it not to be directly inferred in mere knowledge of the coin data set.

The difference between an anonymous masked coin data set and a pseudonymised masked coin data set lies in the identifiability of the security element by the coin register when it uses the pseudonym. An anonymous masked coin data set does not contain any information about its origin, so it cannot be associated with a security element. In contrast, a pseudonymised masked coin data set has a link to a pseudonym of the security element, so that the security element that sent the pseudonymised masked coin data set to the coin register can be identified by the linked pseudonym.

When an electronic coin data set is issued by the issuing entity to a security element, a masked electronic coin data set can be issued in parallel by the issuing entity to the coin register of the payment system for registration of the electronic coin data set.

This masked electronic coin data set is obtained by applying a homomorphic one-way function, in particular a homomorphic cryptographic function. This function is a one-way function, i.e. a mathematical function that is "easy" to calculate in terms of complexity theory, but "difficult" to practically impossible to reverse. In this context, one-way function also refers to a function for which no inversion is known that can be practically executed in a reasonable amount of time and with a reasonable amount of effort. Thus, the calculation of a masked electronic coin data set from an electronic coin data set is comparable to the generation of a public key in an encryption method via a residue class group. Preferably, a one-way function is used that operates on a group in which the discrete logarithm problem is difficult to solve, such as a cryptographic method analogous to elliptic curve encryption, or ECC, from a private key of a corresponding cryptographic method. The reverse function, i.e. the generation of an electronic coin data set from a masked electronic coin data set, is thereby—equivalent to the generation of the private key from a public key in an encryption method over a residue class group—very time-consuming. When the present document refers to sums and differences or other mathematical operations, the respective operations on the corresponding mathematical group are to be understood in the mathematical sense, for example the group of points on an elliptical curve.

The one-way function is homomorphic, i.e. a cryptographic method that has homomorphism properties. Thus, mathematical operations can be performed on the non-masked electronic coin data set that can also be performed in parallel on the (masked) electronic coin data set and thus be traced. In the present case, operations are performed in the coin register on the basis of the masked electronic coin data sets, which were performed in the security element with the corresponding non-masked electronic coin data sets. Using the homomorphic one-way function, calculations with masked electronic coin data sets can be traced in the coin register without the corresponding (non-masked) electronic coin data sets being known there. Therefore, certain calculations with electronic coin data sets, for example for processing the (non-masked) electronic coin data set (for example splitting or merging), can also be verified in parallel with the corresponding masked electronic coin data sets, for example for validation checks or for monitoring the legitimacy of the respective electronic coin data set. The homomorphism properties apply at least to addition and subtraction operations, so that a splitting or combining (=merging) of electronic coin data sets can also be recorded in the coin register by means of the corresponding masked electronic coin data sets and can be traced by requesting security elements and/or by the coin register without gaining knowledge about the monetary amount and the performing terminal.

The homomorphism property thus allows a record of valid and invalid electronic coin data sets based on their masked electronic coin data sets to be maintained in a coin register without knowledge of the electronic coin data sets, even when these electronic coin data sets are processed (split, merged, switched), i.e. an action is performed on these electronic coin data sets. This ensures that no additional monetary amount has been created or that an identity of the security element is recorded in the coin register. Masking allows for a high level of security without providing any insight into the monetary amount or the terminal. This results in, for example, a two-layered payment system. On the one hand, there is the coin register, in which masked electronic data sets are checked, and on the other hand, there is a direct transaction layer, in which at least two security elements transmit electronic coin data sets.

When transmitting an electronic coin data set directly from the first security element to the second security element, two security elements have simultaneous knowledge of the electronic coin data set to be transmitted. To prevent the sending first security element from also using the electronic coin data set at another (third) security element for payment (so-called double spending), the method described above is applied. In particular, before transmitting, the status of the coin data set is set to inactive status to invalidate the coin data set, then it is sent and, if there is a receipt confirmation from the second security element, the coin data set is deleted in the first security element. A deletion confirmation from the first security element can be sent to the coin register or the second security element to indicate successful deletion.

In addition, a switch ("switch") of the transmitted electronic coin data set from the first security element to the second security element may be performed. Preferably, the switch can be performed automatically upon receipt of the deletion confirmation of an electronic coin data set in the second security element. Additionally, it may also occur upon request, for example, a command from the first and/or second security element. In addition, an electronic coin data set can also be split into at least two coin data sets ("split"). In addition, two electronic coin data sets can be combined into one coin data set ("merge").

Switching, splitting and merging are different modifications to an electronic coin data set, i.e. actions with the electronic coin data set. These modifications require registering the masked coin data set in the coin register of the payment system. The actual performance of the individual modifications will be explained later.

Switching also occurs when an electronic coin data set has been modified, e.g. split or merged to other electronic coin data sets, especially in order to be able to settle a monetary amount to be paid appropriately. The payment system should always be able to pay any monetary amount as long as the sum of the individual coin data sets does not exceed the monetary amount.

Splitting and subsequent registration has the advantage that an owner of at least one electronic coin data set is not forced to always transmit the entire monetary amount at once, but to now form and transmit corresponding partial monetary amounts. The monetary value can be split symmetrically or asymmetrically without restrictions as long as all electronic coin data subsets have a positive monetary amount that is smaller than the monetary amount of the electronic coin data set from which it is split and the sum of the electronic coin data subsets is equal to the electronic coin data set to be split. Alternatively or additionally, fixed denominations can be used. The division into partial amounts is arbitrary.

The method preferably has the further following steps: Switching the transmitted electronic coin data set; and/or merging the transmitted electronic coin data set to a second electronic coin data set to form a further electronic coin data set, namely merged electronic coin data set.

Upon switching, the electronic coin data subset received from the first security element results in a new electronic coin data set, preferably with the same monetary amount, called the electronic coin data set to be switched. The new electronic coin data set is generated by the second security element, preferably by using the monetary amount of the received electronic coin data set as the monetary amount of the electronic coin data set to be switched. In doing so, a new obfuscation amount, for example a random number, is generated. The new obfuscation amount is added to the obfuscation amount of the received electronic coin data set, for example, so that the sum of both obfuscation amounts (new and received) serves as the obfuscation amount of the electronic coin data set to be switched. After switching, the received electronic coin data subset and the electronic coin data subset to be switched are preferably masked in the security element by applying the homomorphic one-way function to the received electronic coin data subset and the electronic coin data subset to be switched, respectively, to obtain a masked received electronic coin data subset and a masked electronic coin data subset to be switched, respectively.

The switching is thus secured by adding a new obfuscation amount to the obfuscation amount of the received electronic coin data set, thereby obtaining an obfuscation amount known only to the second security element. Newly created obfuscation amounts must have a high entropy, as they are used as a blinding factor for the corresponding masked electronic coin data subset. Preferably, a random number generator on the security element is used for this purpose. This security can be tracked in the coin register.

As part of the switching process, preferred additional information needed to register the switching of the masked electronic coin data set in the coin register is calculated in the security element. Preferably, the additional information includes a range proof of the masked electronic coin data set to be switched and a range proof of the masked received electronic coin data set. The range proof is a verification that the monetary amount of the electronic coin data set is non-negative, the electronic coin data set is validly created and/or the monetary amount and the obfuscation amount of the electronic coin data set are known to the creator of the range proof. In particular, the range proof is used to provide such verification(s) without revealing the monetary amount and/or the obfuscation amount of the masked electronic coin data set. These range proofs are also called "zero-knowledge range proofs". Preferred range proofs used are ring signatures. Subsequently, a registration of the switching of the masked electronic coin data set is performed in the remote coin register.

The step of registering is preferably performed when the second security element is connected to the coin register. While the electronic coin data sets are used for direct payment between two security elements, the masked coin data sets can be registered with a pseudonym in the coin register.

In a further preferred embodiment of the method, a further electronic coin data set (merged electronic coin data set) is determined from a first and a second electronic coin data subset for a merged electronic coin data set. Thereby, the obfuscation amount for the electronic coin data set to be merged is calculated by forming the sum of the respective obfuscation amounts of the first and the second electronic coin data set. Furthermore, preferably the monetary amount for the merged electronic coin data set is calculated by forming the sum of the respective monetary amounts of the first and second electronic coin data sets.

After merging, the first electronic coin data subset, the second electronic coin data subset, and the electronic coin data set to be merged are stored in the (first and/or second) security element by applying the homomorphic one-way function to each of the first electronic coin data subset, the second electronic coin data subset, and the electronic coin data set to be merged, respectively, to obtain a masked first electronic coin data subset, a masked second electronic coin data subset, and a masked electronic coin data set to be merged, respectively. Further, additional information needed to register the merging of the masked electronic coin data sets in the remote coin register is calculated in the security element. Preferably, the additional information includes a range proof over the masked first electronic coin data subset and a range proof over the masked second electronic coin data subset. The range proof is a proof that the monetary amount of the electronic coin data set is non-negative, the electronic coin data set is validly created and/or the monetary amount and the obfuscation amount of the electronic coin data set are known to the creator of the range proof. In particular, the range proof is used to provide such proof(s) without revealing the monetary value and/or the obfuscation amount of the masked electronic coin data set. These range proofs are also called "zero-knowledge range proofs". Preferred range proofs used are ring signatures. Subsequently, a registration of the merging of the two masked electronic coin data subsets is performed in the remote coin register.

With the step of merging, two electronic coin data sets or two electronic coin data subsets can be combined. In this process, the monetary amounts as well as the obfuscation amounts are added together. Thus, as with splitting, a validity of the two original coin data sets can be performed during merging.

In a preferred embodiment, the registering step comprises receiving the masked electronic coin data subset to be switched in the coin register, checking the masked electronic coin data subset to be switched for validity; and registering the masked electronic coin data set to be switched in the coin register when the checking step is successful, whereby the electronic coin data subset to be switched is deemed to be checked.

The payment system is preferably at least two-layered and has a direct payment transaction layer for direct exchange of (unmasked) electronic coin data sets and a coin register layer, which may also be referred to as an "obfuscated electronic data set ledger". In the coin register layer, preferably no payment transactions are recorded, but only masked electronic coin data sets, their status, check values, signatures and modifications, if any, for the purpose of verifying the validity of (non-masked) electronic coin data sets. This ensures the anonymity of the subscribers in the payment system. It also obfuscates transactions, as no monetary amounts and/or identifiers of the security elements of the transaction are stored in the coin register. The coin register layer provides information about valid and invalid electronic coin data sets, for example, to avoid multiple spending of the same electronic coin data set or to verify the authenticity of the electronic coin data set as validly issued electronic money or to record the sum of monetary amounts per security element in order to compare this sum with a limit value and to prevent or allow modification accordingly. The coin register layer may use a counter value of an electronic coin data set to determine whether the electronic coin data set has expired and is to be returned, or modified accordingly so that it is deemed returned.

A device may have or be a security element in which the electronic coin data set is securely stored. The device may have an application on board ready for operation that controls or at least initiates parts of the transmitting process.

The transmission of electronic coin data sets can be carried out with the aid of devices that are logically and/or physically linked to the security elements.

The communication between two devices with the respective security elements can be wireless or wired, or e.g. also by optical means, preferably via QR code or barcode, and can be adapted as a secure channel, for example between applications of the terminals. The optical path can comprise, for example, the steps of generating an optical code, in particular a 2D code, preferably a QR code, and reading in the optical code.

The transmitting of the electronic coin data set is secured, for example, by cryptographic keys, for example a session key negotiated for an electronic coin data set exchange or a symmetric or asymmetric key pair.

By communicating between devices, for example via their security elements, the exchanged electronic coin data sets are protected against theft or manipulation. The level of security elements thus complements the security of established blockchain technology.

In a preferred embodiment, the coin data sets are transmitted as APDU commands. For this purpose, the coin data set is preferably stored in an (embedded) UICC as a security element and is managed there. An APDU is a combined command/data block of a connection protocol between the UICC and a terminal. The structure of the APDU is defined by the ISO-7816-4 standard. APDUs represent an information element of the application layer (layer 7 of the OSI layer model).

Furthermore, it is advantageous that the electronic coin data sets can be transmitted in any format. This implies that they can be communicated, i.e. transmitted, on any channels. They do not have to be stored in a determined format or in a determined programme.

In one embodiment, it can be provided that the first and/or second security element processes the received electronic coin data sets according to their monetary value when several electronic coin data sets are present or received. Thus, it can be provided that electronic coin data sets with a higher monetary value are processed before electronic coin data sets with a lower monetary value.

In one embodiment, the security element may be adapted, after receipt of an electronic coin data set, to merge it to electronic coin data set already present in the security element, depending on attached information, such as a currency or denomination, and to perform a merging step accordingly. Furthermore, the security element can also be adapted to automatically perform a switching after receipt of the electronic coin data set.

In one embodiment, further information, in particular metadata, is transmitted from the first terminal or first security element to the second terminal or second security element during transmission, for example a currency. In one embodiment, this information may be included in the electronic coin data set.

The methods are not limited to a currency. For example, the payment system may be arranged to manage different currencies from different issuing entities. For example, the payment system is arranged to convert (=change) an electronic coin data set of a first currency into an electronic coin data set of another currency. This change is also a modification of the electronic coin data set. With the change, the original coin data set becomes invalid and is considered returned. Flexible payment with different currencies is thus possible and user-friendliness is increased.

The procedures also allow the electronic coin data set to be converted into book money, e.g. the monetary amount to be paid into an account of the subscriber in the payment system. This conversion is also a modification. Upon redemption, the electronic coin data set becomes invalid and is considered returned.

Preferably, the at least one initial electronic coin data set is created exclusively by the issuing entity, wherein preferably the split electronic coin data sets, in particular electronic coin data subsets, can also be generated by a security element. Preferably, the generation and selection of a monetary amount also includes the selection of a high entropy obfuscation amount. The issuing entity is a computing system, which is preferably remote from the first and/or second terminal. After the new electronic coin data set is created, the new electronic coin data set is masked in the issuing entity by applying the homomorphic one-way function to the new electronic coin data set to accordingly obtain a masked new electronic coin data set. Further, additional information needed to register the creation of the masked new electronic coin data set in the remote coin register is calculated in the issuing entity. Preferably, this further information is proof that the (masked) new electronic coin data set originates from the issuing entity, for example by signing the masked new electronic coin data set. In one embodiment, it may be provided that the issuing entity signs a masked electronic coin data set with its signature when generating the electronic coin data set. The issuing entity's key for validating the signature is stored in the coin register for this purpose. The signature of the issuing entity is different from the generated signature of a terminal or a security element.

Preferably, the issuing entity can deactivate an electronic coin data set in its possession (i.e. of which it knows the monetary amount and the obfuscation amount) by masking the masked electronic coin data set to be deactivated with the homomorphic one-way function and preparing a deactivate command for the coin register. Part of the deactivate command is preferably, in addition to the masked electronic coin data set to be deactivated, proof that the deactivate step was initiated by the issuing entity, for example in the form of the signed masked electronic coin data set to be deactivated. As additional information, the deactivate command could include range checks for the masked electronic coin data set to be deactivated. The deactivation may be the result of a return. This is followed by registering the deactivation of the masked electronic coin data set in the remote coin register. The deactivate command triggers the deactivate step.

The steps of creating and deactivating are preferably performed in secure locations, particularly not in the terminals. In a preferred embodiment, the steps of creating and deactivating are performed or triggered only by the issuing entity. Preferably, these steps take place in a secure location, for example in a hardware and software architecture designed to process sensitive data material in insecure networks. Deactivating the corresponding masked electronic coin data set has the effect that the corresponding masked electronic coin data set is no longer available for further processing, in particular transactions. However, in one embodiment, it may be provided that the deactivated masked electronic coin data set remains archival with the issuing entity. The fact that the deactivated masked electronic coin data set is no longer valid or returned may be indicated, for example, by means of a flag or other coding, or the deactivated masked electronic coin data set may be destroyed and/or deleted. The deactivated electronic coin data set is also physically removed from the terminal or security element.

The method according to the invention enables various processing operations (modifications) for the electronic coin data sets and the corresponding masked electronic coin data sets. Each of the processing operations (in particular the creation, deactivation, splitting, merging and switching) is registered in the coin register and appended to the list of previous processing operations for the respective masked electronic coin data set in an unchangeable form. The registration is independent of the payment process between the security elements in terms of both time and location (space). The processing operations "create" and "deactivate" (=return), which concern the existence of the monetary amount itself, i.e. mean the creation and destruction up to the destruction of money, require an additional authorisation, for example in the form of a signature, by the issuing entity in order to be registered (i.e. logged) in the coin register. The remaining processing operations (splitting, merging, switching), of which splitting and merging can also be delegated by a security element to another security element, do not require authorisation by the issuing entity or by the instruction initiator (=payer, e.g. terminal or security element).

Processing in the direct transaction layer only concerns the ownership and/or the allocation of the coin data sets to security elements of the respective electronic coin data sets. A registration of the respective processing in the coin register is realised, for example, by corresponding list entries in a database comprising a number of flags to be performed by the coin register. A possible structure for a list entry comprises, for example, column(s) for a predecessor coin data set, column(s) for a successor coin data set, a signature column for the issuing entity, a signature column for the sending and/or receiving security element, a signature column for coin distribution operations and at least one flag column. A change (modification) is final when and the required flags have been validated by the coin register, i.e. changed from status "0" to status "1" after the corresponding check, for example. If a check fails or takes too long, it is changed from status "−" to status "0" instead, for example. Other status values are conceivable and/or the status values mentioned here are interchangeable. The statuses regarding the modifications are independent of the status during the transmission process (inactive/active). Preferably, the validity of the respective (masked) electronic coin data sets is summarised from the status values of the flags, each in a column for each masked electronic coin data set involved in the registering processing.

In another embodiment, at least two preferably three or even all of the aforementioned flags may also be replaced by a single flag that is set when all checks have been successfully completed. Furthermore, the two columns for predecessor data sets and successor data sets can be combined into one column each, in which all coin data sets are listed together. This would make it possible to manage more than two electronic coin data sets per field entry, e.g. to split them into more than two coin data sets.

The checks by the coin register to verify whether a processing is final are already described above and are in particular:
Are the masked electronic coin data sets of the predecessor column(s) valid?
Does monitoring result in the correct check value?
Are the range proofs for the masked electronic coin data sets successful?
Is the signature of the masked electronic coin data set a valid signature of the issuing entity?
Does the sending/receiving terminal (pseudonym) exceed a limit value for a maximum allowable monetary amount, especially per time unit?
Is the coin data set inactive due to transmission between security elements?

Preferably, a masked electronic coin data set is also invalid when one of the following checks applies, i.e. when:
(1) the masked electronic coin data set is not registered in the coin register;
(2) the last processing of the masked electronic coin data set indicates that there are predecessor coin data sets for it, but this last processing is not final; or
(3) the last processing of the masked electronic coin data set indicates that there are successor coin data sets for it and that last processing is final;
(4) the masked electronic coin data set is not the successor to a valid masked electronic data set unless it is signed by the issuing entity;
(5) the monetary amount of the masked electronic coin data set results in a limit value for a maximum allowable monetary amount, in particular per unit of time, being exceeded and the requested de-anonymisation is rejected by the relevant terminal;
(6) An active status for a security element is entered in the coin register, but another security element requests an action (switch, combine, split) under possession indication.

In one aspect, a payment system for exchanging monetary amounts is provided with a coin register layer with a preferably decentrally controlled database, English Distributed Ledger Technology, DLT, in which masked electronic coin data sets are stored; and a direct transaction layer with at least two security elements, in which the procedure described above is feasible; and/or an issuing entity for generating an electronic coin data set. Here, the issuing entity can prove that the masked generated electronic coin data set was generated by it, preferably the issuing entity can identify itself by signing and the coin register layer can verify the signature of the issuing entity.

Preferably, the payment system is adapted to perform the above procedure and/or at least one of the embodiments.

Another aspect concerns a currency system comprising an issuing entity, a coin register layer, a first security element and a second security element, wherein the issuing entity is adapted to create an electronic coin data set. The masked electronic coin data set is adapted to be verifiably created by the issuing entity. The coin register layer is adapted to perform a registration step as set out in the above method. Preferably, the security elements, i.e. at least the first and second security elements, are adapted to perform one of the above methods of transmitting.

In a preferred embodiment of the currency system, only the issuing entity is authorised to initially create and finally withdraw an electronic coin data set. Processing, for example the step of merging, splitting and/or switching, can and preferably is performed by a security element. Preferably, the deactivating processing step can only be performed by the issuing entity.

Preferably, the coin register and the issuing entity are assembled in a server entity or are available as a computer program product on a server and/or a computer.

An electronic coin data set can exist in a variety of different forms and can thus be exchanged via different communication channels, hereinafter also referred to as interfaces. A very flexible exchange of electronic coin data sets is thus created.

The electronic coin data set can be represented in the form of a file, for example. A file consists of data that belong together in terms of content and are stored on a data carrier, data memory or storage medium. Each file is initially a one-dimensional string of bits that are normally interpreted as a group of byte blocks. An application programme (application) or an operating system of the security element and/or the terminal interpret this bit or byte sequence as, for example, a text, an image or a sound recording. The file format used in this process can be different, for example it can be a plain text file representing the electronic coin data set. In particular, the monetary amount and the blind signature are represented as a file.

For example, the electronic coin data set is a sequence of American Standard Code for Information Interchange, or ASCII, characters. In particular, the monetary amount and the blind signature are mapped as this sequence.

The electronic coin data set can also be converted from one form of representation to another form of representation in a device. For example, the electronic coin data set can be received as a QR code in the device and output as a file or string from the device.

These different forms of representation of one and the same electronic coin data set enable a very flexible exchange between security elements or terminals of different technical equipment using different transmission media (air, paper, wired) and taking into account the technical design of a terminal. The choice of the presentation form of the electronic coin data sets is preferably made automatically, for example on the basis of recognised or negotiated transmission media and device components. In addition, a user of a device can also choose the representation form for exchanging (=transmitting) an electronic coin data set.

In a simple case, the data memory is an internal data memory of the terminal. This is where the electronic coin data sets are stored. Easy access to electronic coin data sets is thus guaranteed.

The data memory is in particular an external data memory, also called online memory. Thus, the security element or the terminal has only one means of access to the externally and thus securely stored electronic coin data sets. In particular, if the security element or terminal is lost or malfunctions, the electronic coin data sets are not lost. Since ownership of the (non-masked) electronic coin data sets equals ownership of the monetary amount, money can be stored and managed more securely by using external data memories.

If the coin register is a remote entity, the device preferably interfaces for communication using a common internet communication protocol, for example TCP, IP, UDP or HTTP. The transmission may include communication over the cellular network.

In a preferred embodiment, the security element is arranged to perform the processing already described, in particular splitting, merging and switching, on an electronic coin data set. The computing unit is arranged to mask an electronic coin data set to be switched as the electronic coin data set and to link it with a pseudonym that the security element needs as the masked electronic coin data set for registering the switching command or in the switching step. In this way, an electronic coin data set can be switched as described above.

In addition or alternatively, the computing unit is preferably arranged to mask an electronic coin data set divided into a number of coin data subsets and to link it with a pseudonym in order to obtain a masked electronic coin data set and possibly masked electronic coin data subsets that can be registered in the coin register. In this way, an electronic coin data set can be split as described above.

Furthermore or alternatively, the computing unit is preferably arranged to mask an electronic coin data subset to be merged from a first and a second electronic coin data set as the electronic coin data set and to link it with a pseudonym to obtain a masked coin data set to be merged as the masked electronic coin data set to be registered in the coin register. In this way, an electronic coin data set can be merged as described above.

In a preferred embodiment, the interface for outputting the at least one electronic coin data set is an electronic display unit of the terminal, which is arranged to display the electronic coin data set and/or the successful transmission of the coin data set (as described above) and/or optionally (also) to output the electronic coin data set in visual form. As already described, the electronic coin data set can then be exchanged between terminals, for example in the form of an optoelectronically detectable code, an image, etc.

In a preferred embodiment, the interface for outputting (=sending) the at least one electronic coin data set is a protocol interface for wirelessly sending the electronic coin data set to the other security element via a terminal using a communication protocol for wireless communication. In particular, near-field communication is provided, for example by means of Bluetooth protocol or NFC protocol or IR protocol; alternatively or additionally, WLAN connections or mobile radio connections are conceivable. The electronic coin data set is then adapted according to the protocol properties or integrated into the protocol and transmitted.

In a preferred embodiment, the interface for outputting the at least one electronic coin data set is a data interface for providing the electronic coin data set to the other security element by means of an application. In contrast to the protocol interface, the electronic coin data set is transmitted by means of an application. This application then transmits the electronic coin data set in a corresponding file format. A file format specific to electronic coin data sets can be used. In its simplest form, the coin data set is transmitted as an ASCII string or as a text message, for example SMS, MMS, instant messenger message (such as Threema or WhatsApp). In an alternative form, the coin data set is transmitted as an APDU string. A wallet application may also be provided. In this case, the exchanging security elements or their terminals preferably ensure that an exchange is possible by means of the application, i.e. that both security elements or their terminals have the application and are ready for exchange.

In a preferred embodiment, the security element or device further has an interface for receiving electronic coin data sets.

In a preferred embodiment, the interface for receiving the at least one electronic coin data set is an electronic capture module of the security element or the terminal, arranged to capture an electronic coin data set presented in visual form. The capture module is then, for example, a camera or a barcode or QR code scanner.

In a preferred embodiment, the interface for receiving the at least one electronic coin data set is a protocol interface for wirelessly receiving the electronic coin data set from another security element or terminal by means of a communication protocol for wireless communication. In particular, near-field communication, for example by means of Bluetooth protocol or NFC protocol or IR protocol, is provided. Alternatively or additionally, WLAN connections or mobile radio connections are conceivable.

In a preferred embodiment, the interface for receiving at least one electronic coin data set is a data interface for receiving the electronic coin data set from the other security element or terminal by means of an application. This application then receives the coin data set in a corresponding file format. A file format specific to coin data sets can be used. In its simplest form, the coin data set is transmitted as an ASCII string or as a text message, for example SMS, MMS, Threema or WhatsApp. In an alternative form, the coin data set is transmitted as an APDU string. In addition, the transmission may be by means of a wallet application.

In a preferred embodiment, the interface for receiving the at least one electronic coin data set is also the interface for outputting the electronic coin data set, so that an interface is provided for both sending and receiving the coin data set.

Preferably, the portion of the monetary amount to be received as an electronic coin data set is an electronic coin data subset of a previously symmetrically split electronic coin data set. In this regard, the other security element or device for splitting may either independently contact the coin register or use the security element or terminal as a trusted entity to communicate with the coin register. In a preferred embodiment, in this event, the other security element or terminal would send the security element or terminal an electronic coin data set with a request to split symmetrically into, for example, a first predefined electronic coin data subset and a second predefined electronic coin data subset.

In a preferred embodiment, the security element or device comprises at least one security element reader device arranged to read a security element; a random number generator; and/or a communication interface to a vault module and/or banking institution with access to a bank account to be authorised.

In a preferred embodiment, the data memory is a shared data memory which can be accessed by at least one other security element or terminal, each of which has an application, wherein said application is arranged to communicate with the coin register for corresponding registration of electronic coin records.

Thus, what is proposed here is a solution that issues digital money in the form of electronic coin data sets, which is modelled on the use of conventional (analogue) banknotes and/or coins. The digital money is represented by electronic coin data sets. As with (analogue) banknotes, these electronic coin data sets can be used for all forms of payments, including peer-to-peer payments and/or POS payments.

Knowing all the components (especially monetary amount and obfuscation amount) of a valid electronic coin data set is equivalent to owning (possessing) the digital money. It is therefore advisable to keep these valid electronic coin data sets confidential, e.g. to store them in a security element/vault module (of a terminal) and process them there. In order to decide on the authenticity of an electronic coin data set and to prevent double spending, masked electronic coin data sets are kept in the coin register as a unique corresponding public representation of the electronic coin data set. Knowledge or possession of a masked electronic coin data set does not constitute possession of money. Rather, it is akin to checking the authenticity of the analogue means of payment.

The coin register also contains, for example, flags about performed and planned processing of the masked electronic coin data set. From the processing flags, a status of the respective masked electronic coin data set is derived, indicating whether the corresponding (non-masked) electronic coin data set is valid, i.e. ready for payment. Therefore, a recipient of an electronic coin data set will first generate a masked electronic coin data set and have the coin register authenticate the validity of the masked electronic coin data set. A major advantage of this solution according to the invention is that the digital money is distributed to terminals, merchants, banks and other users of the system, but no digital money or further metadata is stored with the coin register—i.e. a common entity.

The proposed solution can be integrated into existing payment systems and infrastructures. In particular, there can be a combination of analogue payment transactions with banknotes and coins and digital payment transactions according to the present solution. Thus, a payment transaction can be made with banknotes and/or coins, but the change or change back is available as an electronic coin data set. For example, ATMs with a corresponding configuration, in particular with a suitable communication interface, and/or mobile terminals can be provided for the transaction. Furthermore, an exchange of electronic coin data set into banknotes or coins is conceivable.

The steps of creating, switching, splitting, merging and deactivating (returning) are each triggered by a corresponding create, switch, split, merge or deactivate command (return commands).

BRIEF SUMMARY OF FIGURES

In the following, the invention or further embodiments and advantages of the invention will be explained in more detail with reference to figures, wherein the figures only describe embodiments of the invention. Identical components in the figures are given the same reference signs. The figures are not to be regarded as true to scale, and individual elements of the figures may be shown in exaggeratedly large or exaggeratedly simplified form.

It is shown:

FIG. 1a,b an embodiment of a payment system according to the prior art;

FIG. 7 an embodiment of a payment system, in particular a coin register;

FIGURE DESCRIPTION

FIG. 1*a* and FIG. 1*b* show an embodiment of a payment system according to the prior art and already described in the introduction. By way of repetition it is pointed out, that the terminal M8 wishes to register the coin data set $C_c$ as the coin data set $C_e$ at the coin register 4 and the coin register 4 determines that the coin data set $C_b$ is already invalid. As a result, the coin register 4 does not accept either the supposedly valid coin data set $C_c$ or the coin data set $C_e$ to be switched.

The problem can occur when, for example, an attacker M1 passes the coin data set $C_b$ directly to two subscribers M2 and M3. As soon as M2 registers the coin data set in the coin register 4, the coin data set $C_b$ becomes invalid. An unsuspecting subscriber (terminal) M3 instead passes on the coin data set $C_b$ directly without having it registered. Only the terminal M8 breaks the direct transmission chain, wherein the coin register 4 recognises the invalidity of the coin data set $C_b$ and the double-spending is detected. A central bank (hereinafter synonymous with an issuing entity of the electronic coin data sets) therefore wants, on the one hand, to limit the number of direct transmitting of coin data sets and, on the other hand, in the event of a detected attack, to be able to trace where the attack took place.

Thus, in the prior art, an attack (double spending of an electronic coin data set) by M1 is detected much later and a large number of direct transmissions have been carried out in an unauthorised manner. In addition, the large number of transactions of an electronic coin data set and also the advancing lifespan increase the risk of manipulation(s) of the electronic coin data set. It is therefore desirable that when a certain lifetime or number of actions in total on/with the coin data set is exceeded, the coin data set expires.

Figure 13:
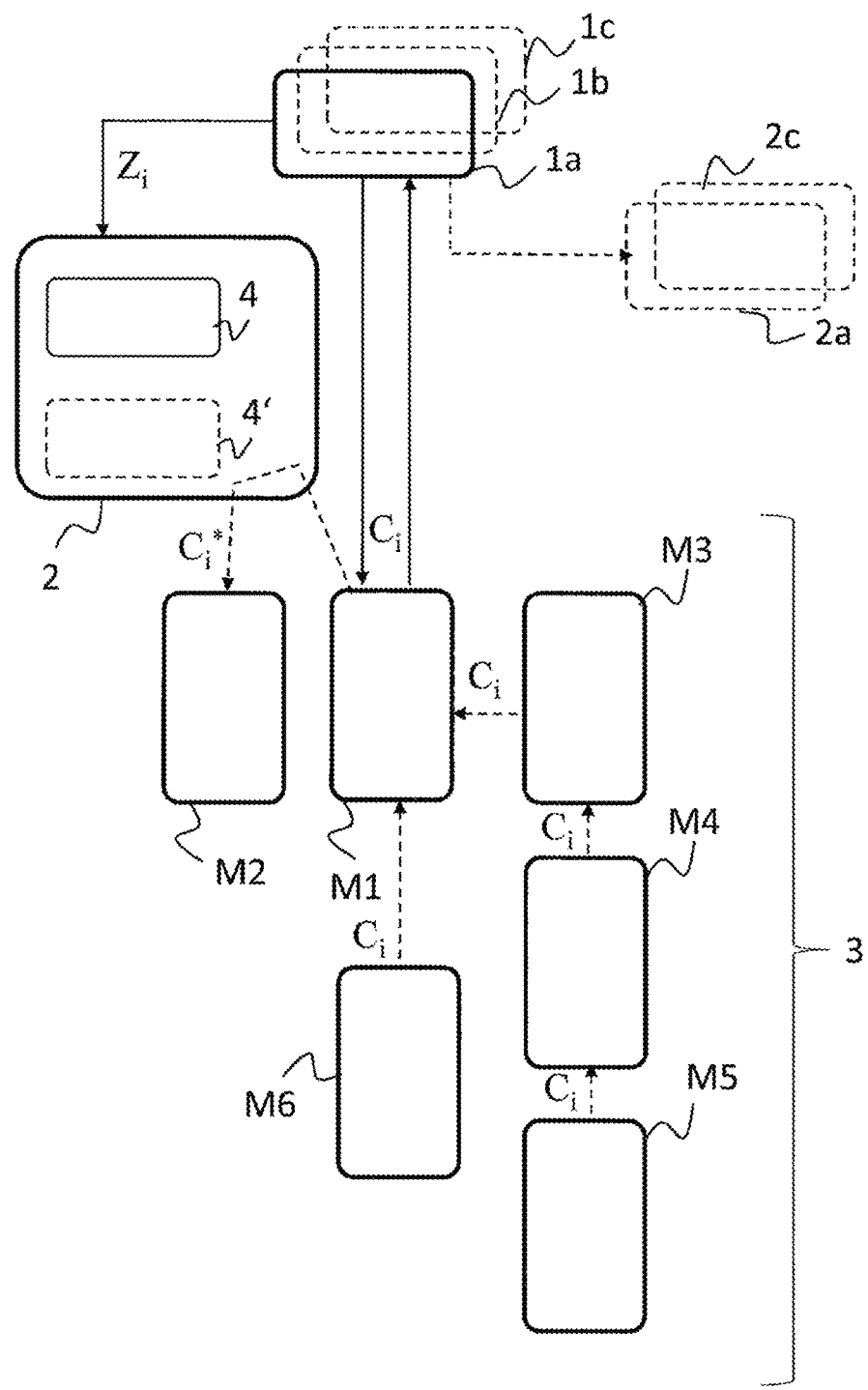
FIG. 13 a system according to the invention.

The overall system according to the invention comprises an issuing entity (central bank), at least one payment system and a plurality of subscribers represented as security elements (terminals Mx). The payment system comprises, for example, commercial banks and one (or more) central coin registers, which registers the coin data sets and checks and logs the modifications to the coin data set. Another example of an overall system is also shown in FIG. 13.

Figure 2:
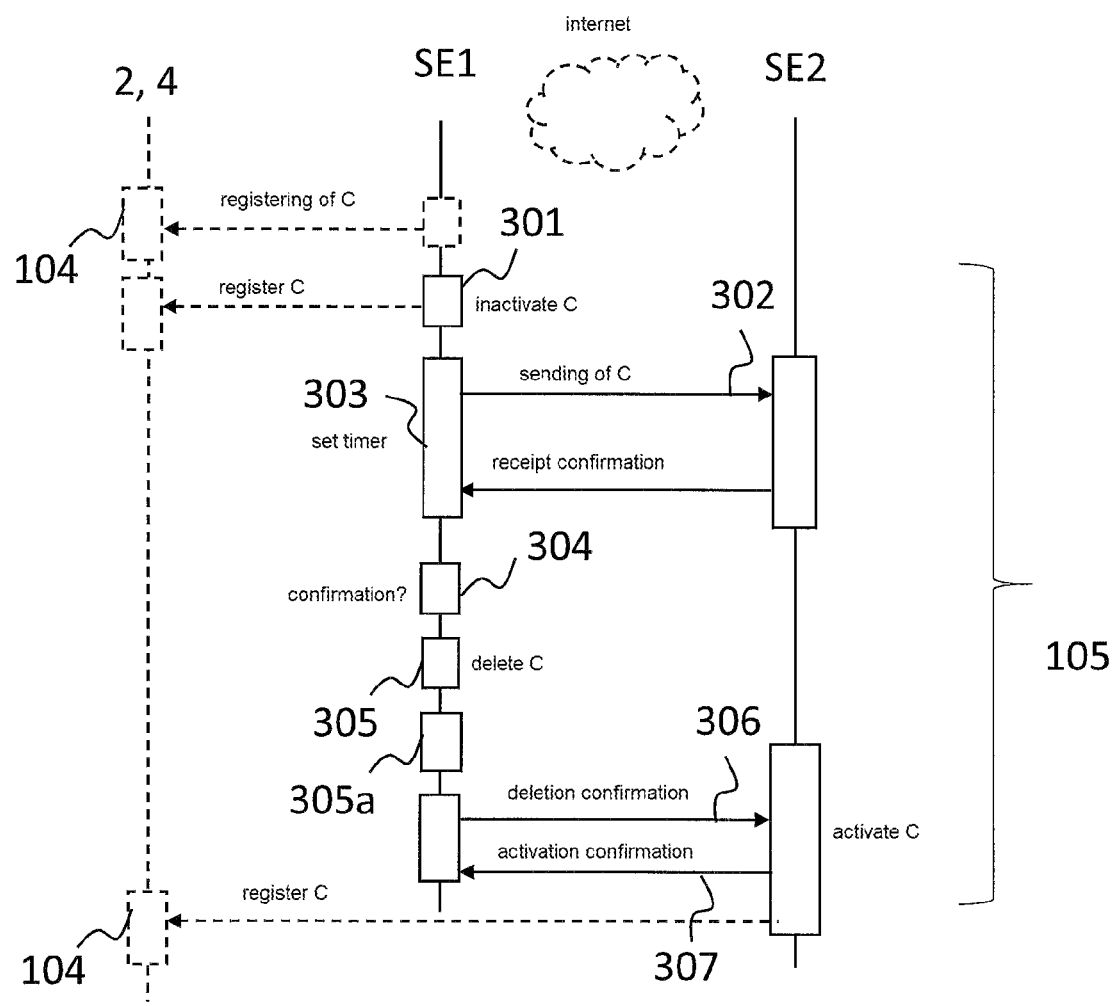
FIG. 2 an embodiment of a method flow diagram of a method according to the invention.

FIG. 2 shows an embodiment of a flow chart of a method according to the invention for transmitting 105 an electronic coin data set, hereinafter eMD for short, C from a first security element SE1 to a second security element SE2. The security elements SE are, for example, eUICC or smart cards.

The SE1 may have received an eMD C from a less trusted entity, such as a terminal or machine or online service, as a subscriber in the payment system. For example, an import function is provided in the SE1 for this purpose. EMDs from such an insecure origin, in particular not directly from another SE, are considered insecure and are checked for validity after receipt in the SE using the coin register 2 of the payment system.

The SE1 registers the eMD C to itself in optional step 104, as will be explained below. In step 301, the SE1 sets the status of the eMD C to "inactive" to begin transmitting 105 the eMD C to the SE2. Optionally, the changed status is registered in the coin register 4. For example, the status is set in a data memory of the SE1. In addition (not shown), the SE1 optionally creates a transaction data set consisting of a transaction number, a recipient address (here of SE2), a sender address (here of SE1), and a monetary amount of the eMD C and stores it in the SE1. The transaction data set can be used to log the transmit 105 and can be used to reverse (FIG. 4) or retry (FIG. 3) in the event of an error.

In step 302, the eMD C is sent to the SE2. For this purpose, a secure channel was established between the SE1 and the SE2, in which both SEs authenticated each other. The transmission path between the SE1 and SE2 is not necessarily direct, but can be an Internet or near-field communication path with intermediate entities (terminals, routers, switches, applications), which are summarised in FIG. 2 as the "Internet" cloud. By using SEs as a secure environment, a higher level-of-trust is created, i.e. a trustworthiness is increased. Simultaneously with sending 302, or immediately before or after, a timer is started in optional step 303. The eMD C invalidated in step 301 can no longer be used by the SE1 for actions (as described below). The eMD is thus blocked in the payment system due to a transmission process 105 that has already been triggered (and not yet completed). This prevents double spending after the sending step 302. Invalidating allows easy handling during the transmission process 105.

When the eMD C is properly received in the SE2, a receipt confirmation is generated by the SE2 and returned to the SE1. The receipt confirmation from the SE2 may be sent as a delete request, because only after the eMD C has been deleted in the SE1 can (may) the eMD C be validated and used in the SE2.

In step 304, the SE1 checks whether a receipt confirmation has been received from the SE2. According to FIG. 2, a receipt confirmation has been received, so in step 305, the SE1 deletes the eMD C. Deleting an eMD may be moving the eMD to a storage area of the eMD that is considered an archive and represents the history of deleted eMDs as archival storage. Alternatively, the eMD is physically deleted from the data memory. As the eMD has already been successfully sent to the SE2, the monetary amount of the eMD C has not been destroyed but—as desired—transferred (transmitted).

In step 305*a*, the deletion of the eMD C from the SE1 can optionally be indicated. In this process, for example, an amount display of the SE1 (or of a terminal ME1 in which the SE1 is logically located) is updated. For example, the monetary amount of the eMD C is subtracted from an amount of the SE1 available for payment transactions. In doing so, this process 300 adopts a controlling role such that the deletion process initiated at step 305 is causal to the updating of a user display, thus controlling the fate of the eMD C of any parent application that may be used.

In step 306, a deletion confirmation is sent to the SE2. This serves as an acknowledgement that the eMD C is no longer present in the SE1 and can therefore be validated in the SE2. Upon receipt of the deletion confirmation in the SE2, the SE2 will convert the status of the eMD C in the SE2 to an active status, the eMD C is thus validated and can be used for further payment transactions or actions (split, combine, switch) in the SE2 from this point on.

Optionally, the SE2 sends an activation confirmation to the SE1 in step 307. The transmission process 105 is thus completed and the eMD C has been successfully transmitted from the SE1 to the SE2.

Optionally, the eMD C of the SE2 is switched to the SE2 in the coin register (see below), whereby the eMD C is registered to the SE2 (step 104).

Figure 3:
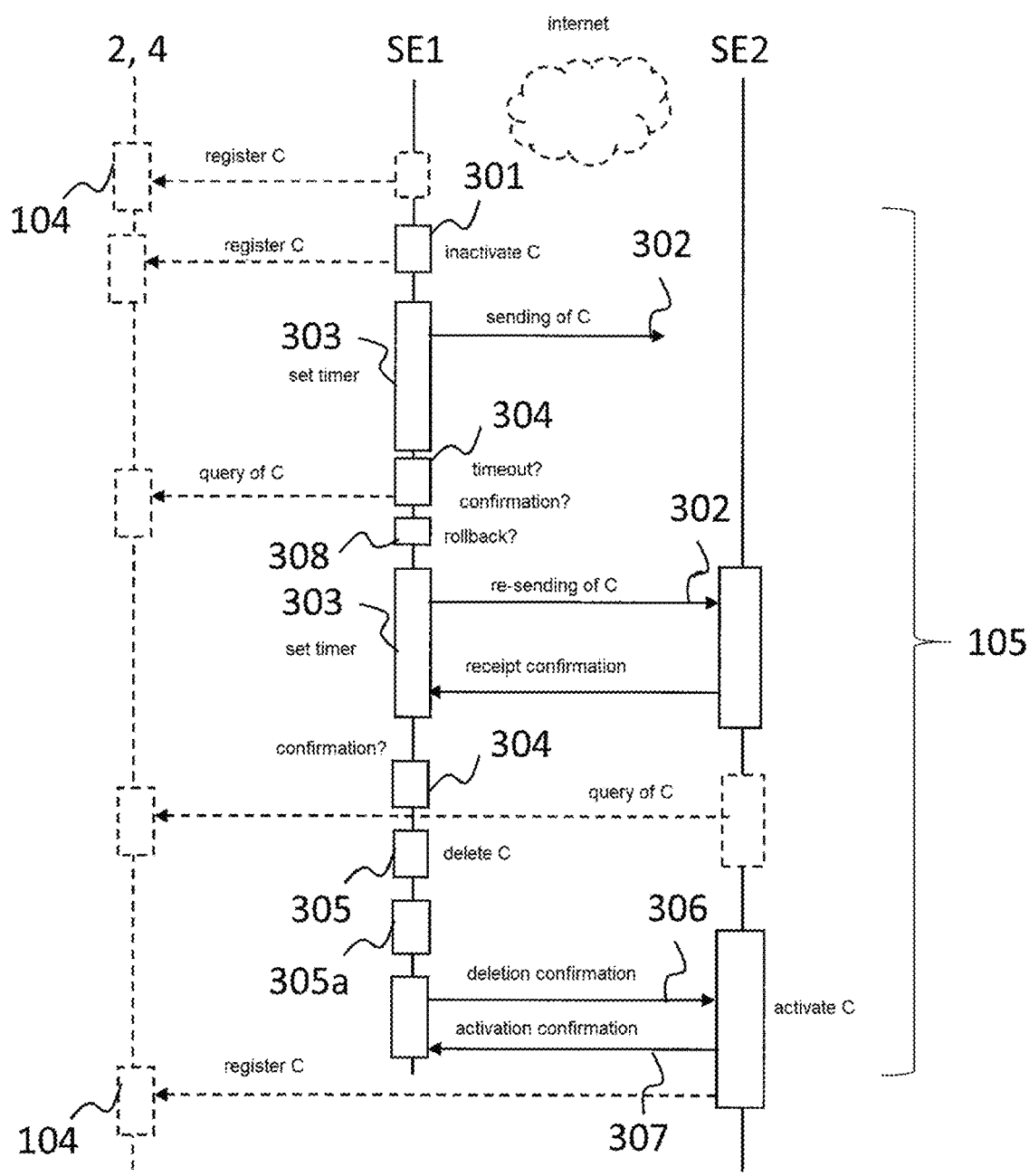
FIG. 3 an embodiment of a further development of the method flow diagram shown in FIG. 2.
Figure 4:
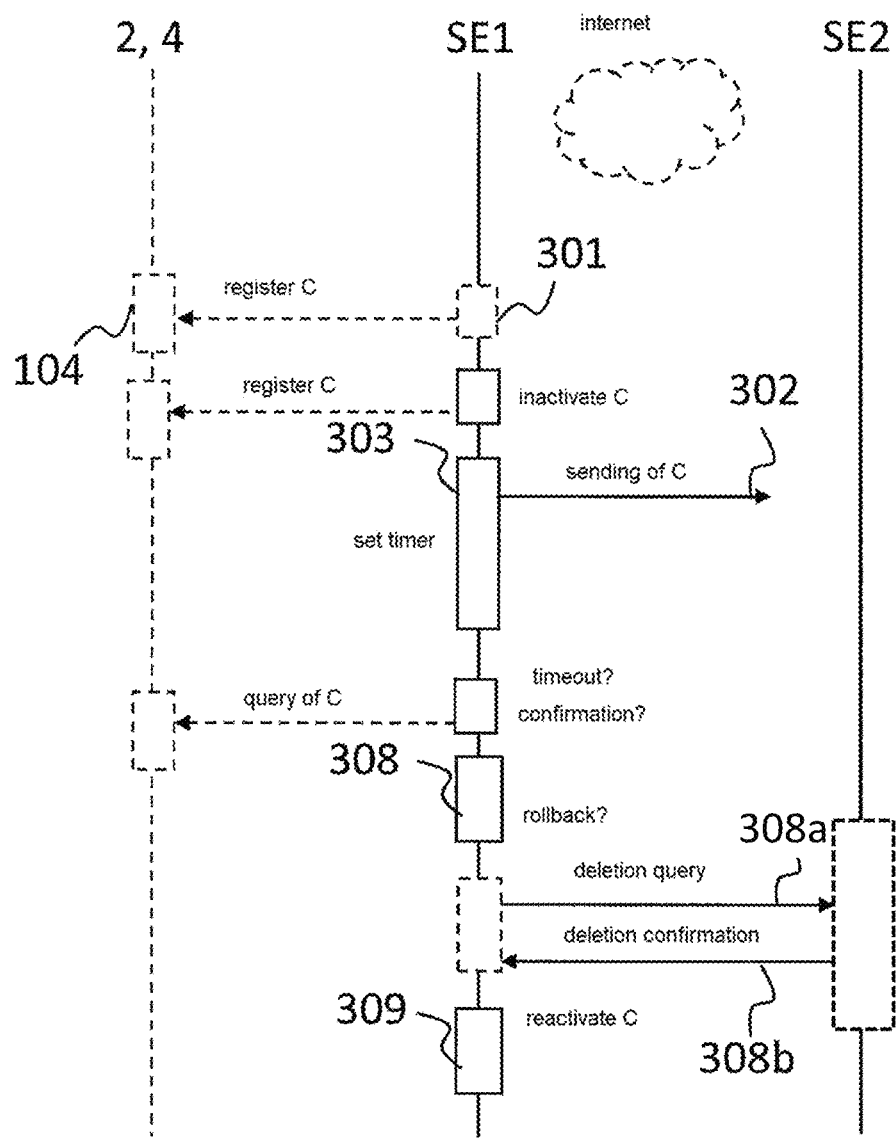
FIG. 4 an embodiment of a further development of the method flow diagram shown in FIG. 2.

FIG. 3 and FIG. 4 each show further developments of the sequence of a transmission process 105 according to FIG. 2. The first steps 104, 301, 302 and 303 of FIG. 3 are identical to steps 104, 301, 302 and 303 of FIG. 2 and are therefore not explained again here. Unlike FIG. 2, the SE2 does not receive the eMD C (see end of arrow of step 302).

The SE2 does not receive the eMD C on the first sending attempt 302. This indicates a transmission error, the causes of which (as described above) can be manifold. For example, the SE1 may lose an NFC connection to its own terminal M1 C (not shown), the SE2 may lose an NFC connection to its own terminal M2 or to the other terminal M1 (not shown), a device disconnect or a transmission protocol error may occur. In all events, the SE2 will not generate a receipt confirmation.

The error is detected in the SE1, shown in FIG. 3 and FIG. 4 by checking 304, for example by exceeding a predefined time period, indicated by the timer according to step 303 or by receiving an error message from the SE2 or the terminal M1 or the other terminal M2 (not shown).

A decision is then made in step 308 as to whether the eMD C should be sent again or whether the transmission should be reversed. This decision may depend on the type of error or the number of retries (e.g. only X number of retries possible) and leads to different procedures according to FIG. 3 or FIG. 4. In FIG. 3, the decision is made to send the eMD C again. For this purpose, transmitting 105 is carried out according to steps 302 to 307 of FIG. 2, which are not retried here due to their identical character to FIG. 2. The transaction data set created for this purpose can help to retry the transaction. However, it is preferred to create a new transaction data set with each transaction attempt in order to also log the failures and to be able to reconstruct or evaluate them later. The transmission process 105 is thus successfully completed with the second attempt and the eMD C has been successfully transmitted from the SE1 to the SE2.

FIG. 4 shows an alternative procedure to FIG. 3 from checking step 308, namely in the event that the SE1 decides (or has the specification) that no retry is to be performed, but that the procedure is to be rolled back (rollback method). In the event of this, in step 309 the eMD C is reactivated by the SE1 and is again usable/available for transactions or actions in the SE1 from this point on.

The step 308 may include a checking step. For example, with each resending attempt (RETRY), a counter value can be incremented and, if a maximum permissible number of repetition attempts is exceeded, for example 10 or 5 or 3 times, it is automatically decided in step 308, independently of the error case, that no resending attempt (RETRY) is to be performed, but that the transmission 105 is to be terminated as unsuccessful and the method according to FIG. 4 is to be run.

The step 308 can alternatively or additionally be decided depending on a detected error case, so that a "fatal error" leads to a rollback of FIG. 4, but a connection error of an NFC communication leads to a repetition according to FIG. 3.

The step 308 can alternatively or additionally be decided depending on a generated error message.

The steps of FIG. 3 and FIG. 4 are preferably performed without a query at a coin register, whereby the method does not require a connection to the coin register to perform the transmission 105.

In an alternative embodiment of the method, step 301 reports the status of the eMD from the SE1 to the coin register 4. The checking step 304 establishes a connection with the coin register 4 and performs a status request to the eMD C. When the coin register 4 furthermore reports an inactive status back to the eMD C (registered to the SE1), no transaction error (manipulation attempt) is assumed and the procedure continues as described. However, when the coin register 4 returns an active status to the eMD C or a registration to another SE, a transaction error (manipulation attempt) is assumed and the payment system is alerted. The transaction data set of the SE1 is used as proof.

In further alternative embodiment of the method, step 301 reports the status of the eMD from the SE1 to the coin register 4. On the part of SE2, if a deletion confirmation is not received after the receipt confirmation is sent, a connection is established with coin register 4 and a status query is performed on the eMD C. Furthermore, when the coin register 4 reports an inactive status back to the eMD C (registered to the SE1), no transaction error (manipulation attempt) is assumed and a receipt confirmation is sent again and then the method continues as described. However, when the coin register 4 reports an active status to the eMD C or a registration back to the SE1 or another SE, a transaction error (manipulation attempt) is assumed and the payment system is alerted. A transaction data set of the SE2 is used for proof or the transaction data set of the SE1 is requested to the eMD.

Figure 5:
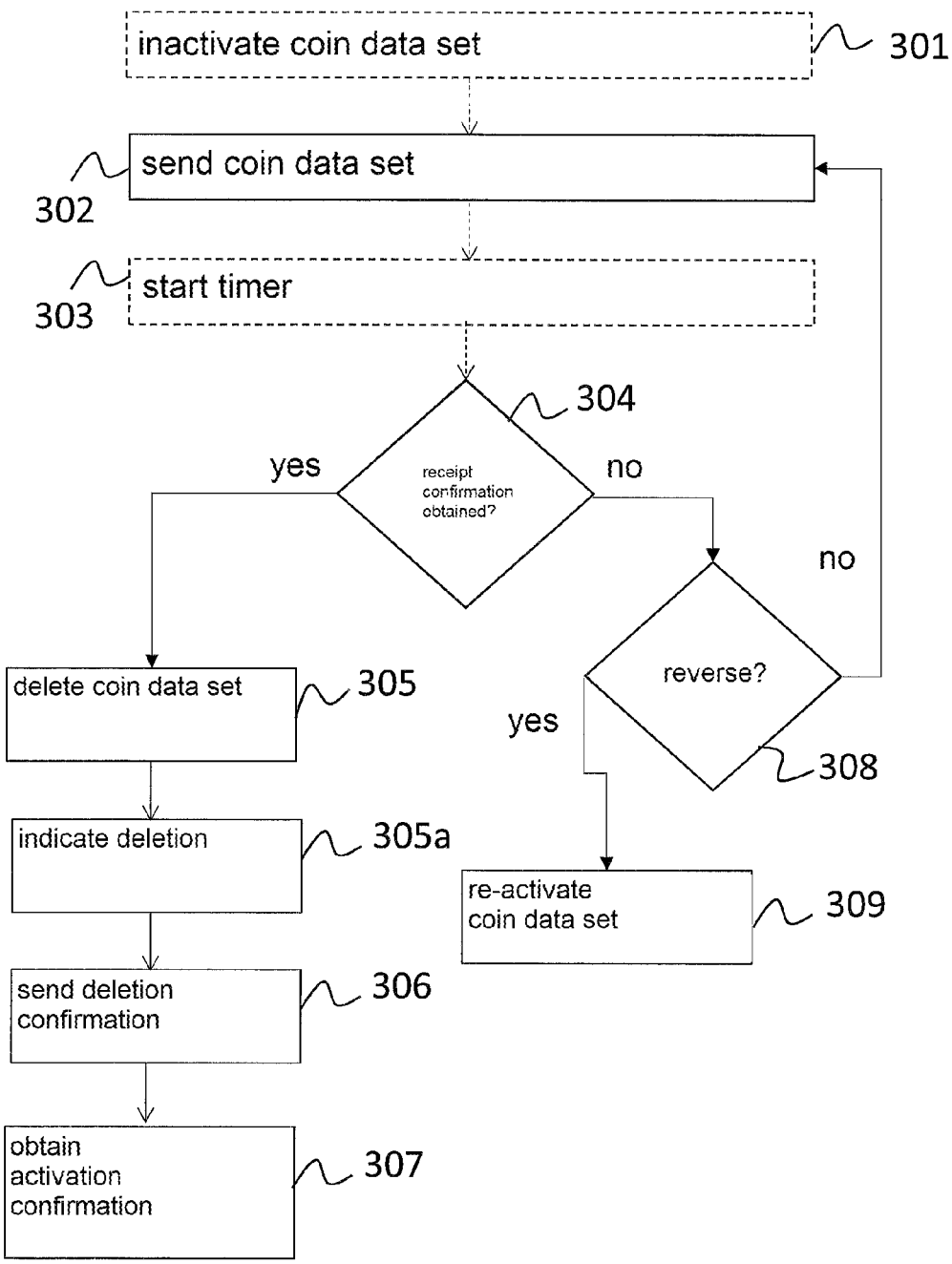
FIG. 5 an embodiment of a method flow diagram of a method according to the invention in the first security element.

FIG. 5 shows a method flow of a transmission process 105 in an SE1 according to the invention, as already described in FIGS. 2 to 4.

Optionally, an eMD is invalidated in step 301. In the subsequent step 302, the eMD is sent. In the optional step 303 a timer is started. Optionally, step 303 can be performed before step 302. In a checking step 304, it is checked whether a receipt confirmation was received.

In the yes event of step 304, the eMD in the SE1 is deleted from the SE1 in the subsequent step 305. Optionally, the deletion is indicated to the subscriber (user) in step 305a. In the subsequent step 306, the SE1 sends a deletion confirmation and receives an activation confirmation in the subsequent step 307. The yes case of step 304 represents a successful transmission 105.

In the no event of step 304, a decide step 308 (also a checking step) optionally follows to decide whether to retry sending (no event of step 308) or to terminate transmitting 105 as unsuccessful (yes event of step 308). In the yes event of step 308, the eMD is reactivated in the subsequent step 309 and is available for transactions or actions in the SE1. In the no event of step 308, the procedure is retried from step 302. This decide step 308 can also be omitted and always a reversal or always a retry can be defined.

As explained in FIG. 3 and FIG. 4, a counter value may be queried in step 308 to limit the number of retry attempts to a predefined number.

The electronic coin data set may be requested in advance from an issuing entity and optionally received by a terminal or the issuing entity or a payment system. Steps 104 and 105 may correspond to steps 104 and 105 of FIG. 10. An action (splitting, merging, switching, transmitting, redeeming, changing) on the eMD may correspond to any of the actions of FIGS. 6 to 12.

The indication in step 305a can additionally be understood as a report of the eMD to the coin register 4 in order to keep track of the transmission in the coin register.

In the eMD, a check value can still be kept as a data element. This check value is incremented each time this coin data set is transmitted directly between terminals. In the payment system, a counter value may also be maintained or determined to include the check value, for example as the sum of the previous (registered) counter value and the check value, to determine whether the coin data set is to be returned. Each action with the coin data set increases this counter value. Different action types weight the counter value differently, so that, for example, a direct passing on of the coin data set has a higher weight than a modification (splitting, combining). In this way, the life span and the actions performed in a coin data set are evaluated and criteria for its return are defined according to the actions performed. The checking value and also the counter value represent the life cycle of the coin data set, which is then used to decide on its return.

Figure 6:
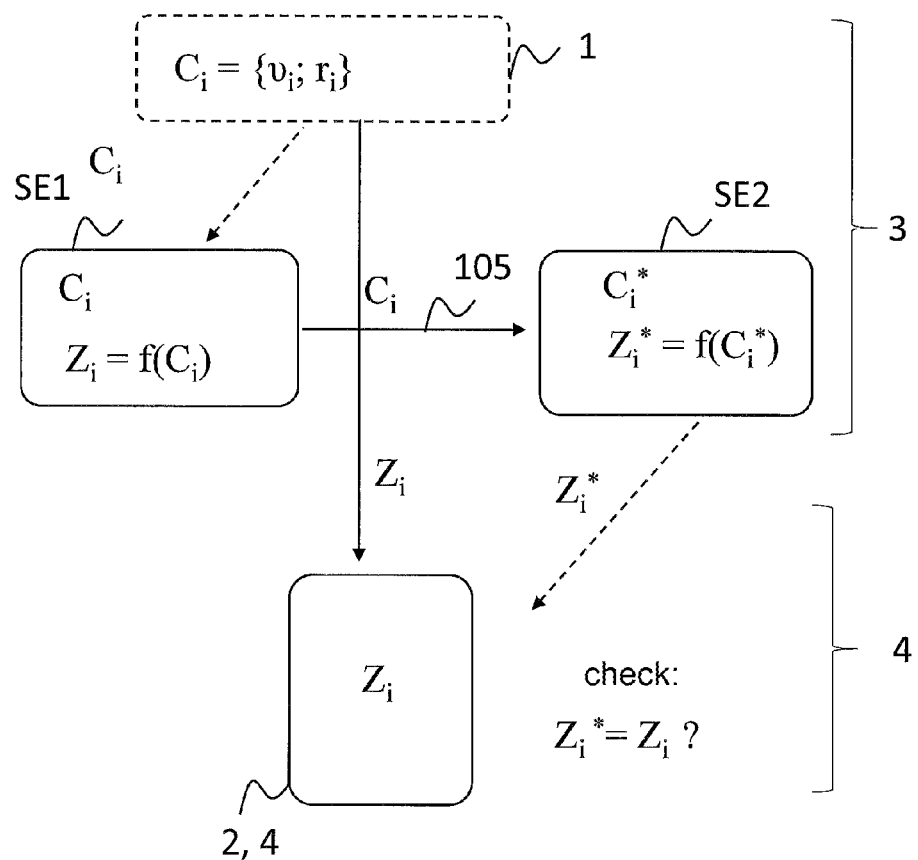
FIG. 6 an embodiment of a system according to the invention.

FIG. 6 shows an embodiment of a payment system with security elements SE1 and SE2 according to the invention. The SE1 and SE2 can be installed ready for operation in terminals M1 and M2 and can be logically or physically connected.

In this case, an electronic coin data set $C_i$ is generated in an issuing entity 1, for example a central bank. A masked electronic coin data set Z is generated for the electronic coin data set $C_i$, provided with an obfuscation amount and registered in a "masked electronic data set ledger" as a coin register 4. In the context of the present invention, a ledger is understood to be a list, a directory, preferably a database structure. The electronic coin data set $C_i$ is output to a first terminal M1.

For example, a true random number was generated as the obfuscation amount $r_i$ for this purpose. The obfuscation amount $r_i$ is linked to a monetary amount $v_i$. An i-th electronic coin data set according to the invention could thus read:

$$C_i=\{v_i;r_i\} \quad (1)$$

A valid electronic coin data set can be used for payment. The owner of the two values $v_i$ and $r_i$, is therefore in possession of the digital money. However, the digital money is defined by a pair consisting of a valid electronic coin data set and a corresponding masked electronic coin data set $Z_i$. A masked electronic coin data set $Z_i$ is obtained by applying a homomorphic one-way function f ($S_i$) according to equation (2):

$$Z_i=f(C_i) \quad (2).$$

This function f ($C_i$) is public, i.e. any system subscriber can call and use this function. This function f ($C_i$) is defined according to equation (3):

$$Z_i=v_iH+r_iG \quad (3)$$

wherein H and G are generator points of a group G in which the discrete logarithm problem is hard, with generators G and H for which the discrete logarithm of the other basis is unknown. For example, G and H are generator points of an elliptic curve encryption, ECC, —that is, private keys of ECC. These generator points G and H must be chosen in such a way that the context of G and H is not publicly known, so that if:

$$G=n H \quad (4)$$

the link n must be practically undetectable to prevent the monetary amount $v_i$ from being manipulated and yet a valid $Z_i$ could be calculated. Equation (3) is a "Pederson commitment for ECC", which ensures that the monetary amount $v_i$ can be committed to a coin register 4 without revealing it to the coin register 4. The public and remote coin register 4 is therefore only sent (disclosed) the masked coin data set $Z_i$.

Even when in the present example an encryption based on elliptic curves is described, another cryptographic method based on a discrete logarithmic method would also be conceivable.

Due to the entropy of the obfuscation amount $r_i$, equation (3) makes it possible to obtain a cryptographically strong $Z_i$ even with a small range of values for monetary amounts $v_i$. Thus, a simple brute force attack by merely estimating monetary amounts $v_i$ is practically impossible.

Equation (3) is a one-way function, which means that computing $Z_i$ from $C_i$ is easy because an efficient algorithm exists, whereas computing $C_i$ starting from $Z_i$ is very hard because no polynomial-time solvable algorithm exists.

In addition, equation (3) is homomorphic for addition and subtraction, which means that:

$$Z_i+Z_j=(v_iH+r_iG)+(v_jH+r_jG)=(v_i+v_j)H+(r_i+r_j)G \quad (5)$$

Thus, addition operations and subtraction operations can be performed both in the direct transaction layer 3 and in parallel in the coin register 4 without the coin register 4 having knowledge of the electronic coin data sets $C_i$. The homomorphic property of equation (3) allows monitoring of valid and invalid electronic coin data sets $C_i$ based solely on the masked coin data sets $Z_i$ and ensuring that no new monetary amount $v_i$ has been created.

This homomorphic property allows the coin data set $C_i$ to be divided according to equation (1) into:

$$C_i=C_j+C_k=\{v_j;r_j\}+\{v_k;r_k\} \quad (6)$$

where:

$$v_i=v_j+v_k \quad (7)$$

$$r_i=r_j+r_k \quad (8).$$

For the corresponding masked coin data sets:

$$Z_i=Z_j+Z_k \quad (9)$$

Figure 8:
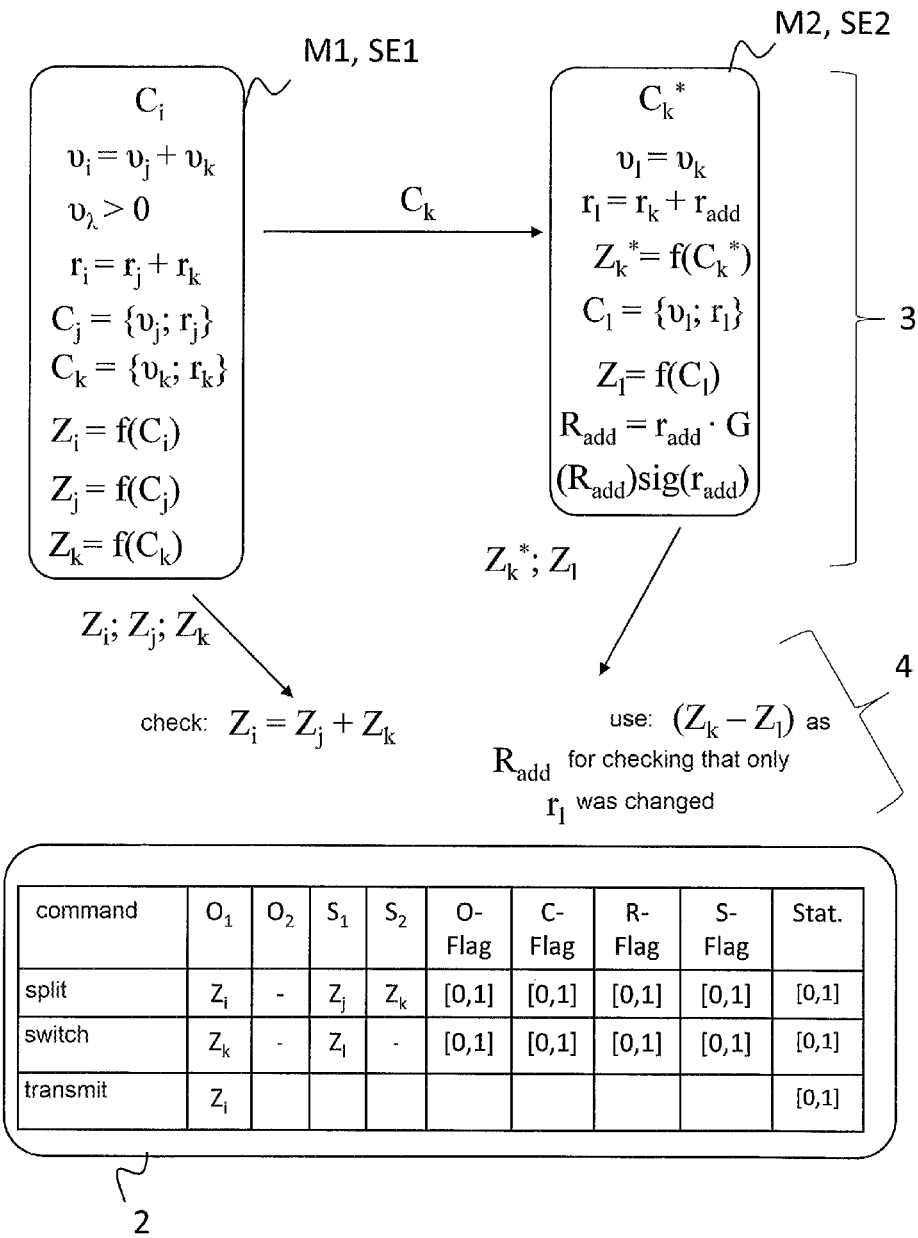
FIG. 8 an embodiment of a system according to the invention for splitting and switching and directly transmitting electronic coin data sets.
Figure 11:
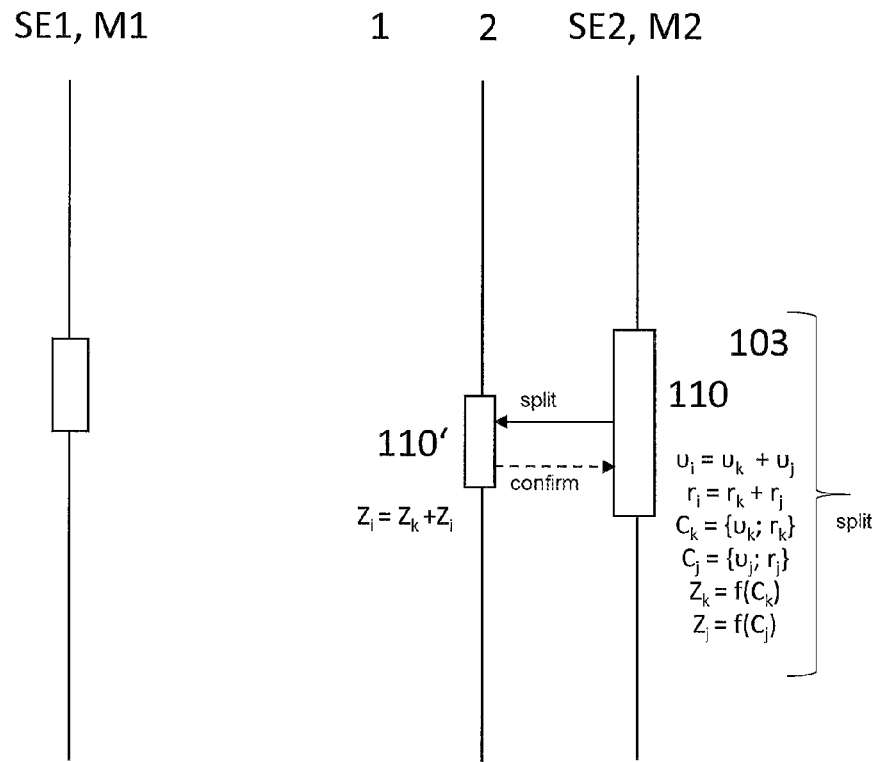
FIG. 11 an embodiment of a method flow diagram of a method according to the invention and corresponding processing steps of a coin data set.

Equation (9) can be used, for example, to easily check a "symmetric or asymmetric splitting" processing or a "symmetric or asymmetric splitting" processing step of a coin data set according to FIG. 8 or 11 without the coin register 4 having knowledge of $C_i$, $C_j$, and $C_k$. In particular, the condition of equation (9) is checked to validate split coin data sets $C_j$ and $C_k$ and invalidate coin data set $C_i$. Such splitting of an electronic coin data set $C_i$ is shown in FIG. 8 or 11.

Figure 10:
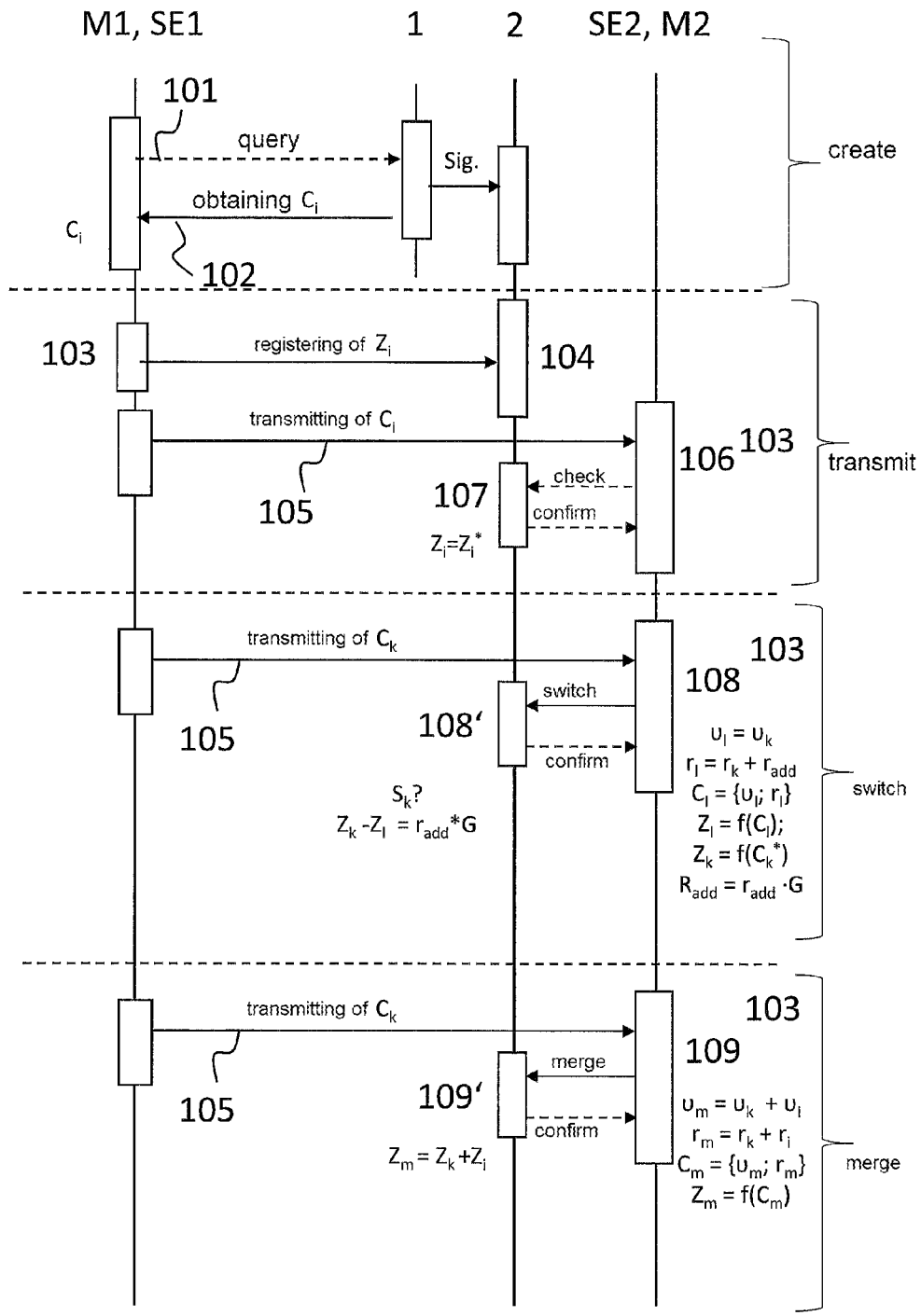
FIG. 10 an embodiment of a method flow diagram of a method according to the invention and corresponding processing steps of a coin data set.

In the same way, electronic coin data sets can also be joined (merged), see FIG. 8 or 10 and the explanations thereto.

In addition, it is important to check whether (not allowed) negative monetary amounts are registered. An owner of an electronic coin data set $C_i$ must be able to prove to the coin register 4 that all monetary amounts $v_i$ in a processing operation are within a value range of [0, . . . , n] without informing the coin register 4 of the monetary amounts $v_i$. These range proofs are also called "range proofs". Ring signatures (English ring signatures) are preferably used as range proofs. For the present embodiment, both the monetary amount v and the obfuscation amount r of an electronic coin data set C are resolved in bit representation. It holds:

$$v_i = \Sigma a_j \cdot 2^j \text{ for } 0 \leq j \leq n \text{ and } a_j \in \{0;1\} \quad (9a)$$

as well as $$r_i = \Sigma b_j \cdot 2^j \text{ for } 0 \leq j \leq n \text{ and } b_j \in \{0;1\} \quad (9b)$$

For each bit, preferably a ring signature with $$C_{ij} = a_j H + b_j G \quad (9c)$$

and $$C_{ij} + a_j H \quad (9d)$$

is performed, wherein in one embodiment it can be provided to perform a ring signature only for certain bits.

In FIG. 6, an electronic coin data set $C_i$ is generated by the issuing entity 1 and made available to the first security element SE1.

In FIG. 6, the electronic coin data set $C_i$ is calculated by the issuing entity 1 by means of equation (3) a masked electronic coin data set $Z_i$ is calculated by the issuing entity 1 and this is registered in the coin register 4 together with at least the second check value $p_{i2}$. The transmission takes place wirelessly via WLAN, NFC or Bluetooth, for example. The transmission can be additionally secured by cryptographic encryption methods, for example by negotiating a session key or applying a PKI infrastructure.

In the second security element SE2, the transmitted electronic coin data set $C_i$ is received as $C_i^*$. With the receipt of the electronic coin data set $C_i^*$, the SE2 is in possession of the digital money represented by the electronic coin data set $C_i^*$. With the direct transmission, it is available to the SE2 for further action. The procedure presented in FIGS. 2 to 4 is used for transmitting 105.

Due to the higher trustworthiness when using SEs, both SE1, SE2 can trust each other and in principle no further steps are necessary to finish the transmission 105. However, SE2 does not know whether the electronic coin data set $C_i^*$ is actually valid. Further steps may be provided in the procedure to further validate the transmitting, as explained below.

To check the validity of the received electronic coin data set $C_i^*$, the masked transmitted electronic coin data set $Z_i^*$ is calculated in SE2 using the—public—one-way function from equation (3). The masked transmitted electronic coin data set $Z_i^*$ is then transmitted to the coin register 4 and searched there. If it matches a registered and valid masked electronic coin data set, the validity of the received coin data set $C_i^*$ is indicated to the SE2 and it is valid that the received electronic coin data set $C_i^*$ is equal to the registered electronic coin data set $C_i$. In one embodiment, the validity check can be used to determine that the received electronic coin data set $C_i^*$ is still valid, i.e. that it has not already been used by another processing step or in another transaction/action and/or has not been subject to further modification.

Preferably, a switch of the received electronic coin data set takes place afterwards.

It applies to the method according to the invention that the sole knowledge of a masked electronic coin data set $Z_i$ does not entitle to spend the digital money. The sole knowledge of the electronic coin data set $C_i$ entitles to pay, i.e. to perform a transaction successfully, in particular when the coin data set $C_i$ is valid, when the electronic coin data set $C_i$ has an active status. The status is—as shown above—preferably only set to an active status when the deletion confirmation of the SE1 is received. There is a one-to-one relationship between the electronic coin data sets $C_i$ and the corresponding masked electronic coin data sets $Z_i$. The masked electronic coin data sets $Z_i$ are registered in the coin register 4, for example a public decentralised database. This registration first makes it possible to check the validity of the electronic coin data set, for example whether new monetary amounts have been created (illegally).

A main distinguishing feature compared to conventional solutions is that the masked electronic coin data sets $Z_i$ are stored in the coin register 4 and all processing on the electronic coin data set $Z_i$ is registered there, whereas the actual transmitting of the digital money takes place in a (secret, i.e. not known to the public) direct transaction layer 3.

In order to prevent multiple issuance or to ensure more flexible transmission, the electronic coin data sets can now be processed in the method according to the invention. Table 1 below lists the individual operations, wherein the specified command also executes a corresponding processing step:

TABLE 1

Number of operations that can be performed per processing of a coin data set in the security element or issuing entity

| Command or step | Generate signature | Generate random number | Generate masking | Generate range proof |
|---|---|---|---|---|
| Create | 1 | 1 | 1 | 0 or 1 |
| Return | 1 | 0 | 1 | 0 or 1 |
| Split | 1 | 1 | 3 | 0 or 1 |
| Merge | 1 | 0 | 3 | 1 |
| Switch | 1 | 1 | 2 | 1 |

Other operations not listed in Table 1 may be required, such as changing the currency or redeeming the monetary amount in an account. Instead of the implementation listed, other implementations are also conceivable that imply other operations. Table 1 shows that for each coin data set, each of the processing operations "Create", "Return", "Split", "Merge" and "Switch" can provide different operations "Create signature"; "Create random number"; "Create masking"; "Range check", wherein each of the processing operation is registered in the coin register 4 and appended there in invariant form to a list of previous processing operations for masked electronic coin data sets $Z_i$. The operations of the processing operations "create" and "return" an electronic coin data set are performed only at secure locations and/or only by selected entities, for example issuing entity 1, while the operations of all other processing operations can be performed on the terminals M1 to M3 or their security elements SE1, SE2, SE3.

The number of operations for the individual processes is characterised with "0", "1" or "2" in Table 1. The number "0" indicates that the security element or issuing entity 1 does not have to perform this operation for this processing of the electronic coin data set. The number "1" indicates that the security element or issuing entity 1 must be able to perform this operation once for this processing of the electronic coin data set. The number "2" indicates that the security element or issuing entity 1 must be able to perform this operation twice for this processing of the electronic coin data set.

In principle, it can also be provided in one embodiment that a range check is also performed by the issuing entity 1 during creation and/or deletion.

Table 2 below lists the operations required for the coin register 4 for the individual processes:

TABLE 2

Number of operations that can be performed per processing of a coin data set in the coin register.

| Command or step | Check signature of issuer | Check signature of security element | Check validity of masked electronic coin data set | Trace range proof | Trace homomorphic properties of masked electronic coin data sets, i.e. add or subtract |
|---|---|---|---|---|---|
| Create | 1 | 0 | 0 | 0 or 1 | 0 |
| Return | 1 | 0 | 1 | 0 or 1 | 0 |
| Split | 0 | 1 | 1 | 2 or more | 1 |
| Merge | 0 | 1 | 2 or more | 1 | 1 |
| Switch | 0 | 1 | 1 | 1 | 0 |

Other operations not listed in Table 2 may be required. Instead of the listed implementation, other implementations are conceivable that imply other operations. All operations of Table 2 can be performed in the coin register 4, which as a trusted entity, for example as a decentralised server, in particular a distributed trusted server, ensures sufficient integrity of the electronic coin data sets.

Table 3 shows the preferred components to be installed for the system subscribers in the payment system of FIG. 1:

TABLE 3

Preferred units in the system components

| Command or step | Issuing entity | Security element | Coin register |
|---|---|---|---|
| Random number generator (high security) | Yes | — | — |
| Random number generator (deterministic) | — | Yes | — |
| PKI for signing | Yes | Yes | — |
| PKI for signature check | — | (Yes) | Yes |
| Read access on DLT | Yes | Yes | Yes |
| Write access on DLT | Yes | Yes | Yes |
| Return of electronic coin data set | Yes | Yes | — |
| Transport encryption | Yes | Yes | — |
| Secure memory | (Yes) | Yes | —/Yes |
| Masking unit | Yes | Yes | — |
| Range proof | — | Yes | — |
| Check range proof | — | — | Yes |
| DLT software | — | — | Yes |

Table 3 shows an overview of the preferred components to be used in each system subscriber, i.e. the issuing entity 1, a security element SE1 and the coin register 4. The security element SE1 can be used as a wallet for electronic coin data sets $C_i$ (with their verification value $p_{i1}$ $p_{i2}$) i.e. adapted as an electronic wallet, i.e. a data memory of the security element SE1, in which a plurality of coin data sets $C_i$ can be stored, and implemented, for example, in the form of an application on a smartphone or IT system of a trader, a commercial bank or another market participant and send or receive an electronic coin data set. Thus, the components in the security element as shown in Table 3 are implemented as software. It is assumed that the coin register 4 is based on a DLT and operated by a number of trusted market participants.

FIG. 7 shows an embodiment of a coin register 4 of the preceding figures. FIG. 7 shows an exemplary database in the form of a table in which the masked electronic coin data sets Z and, if applicable, their processing are registered. The coin register 4 is preferably assembled locally remote from the terminals M or their security elements SE and is housed, for example, in a server architecture.

Each processing operation for a processing (create, return, symmetric or asymmetric split, merge and switch) is thereby registered in the coin register 4 and appended there in unchangeable form to a list of previous processing operations for masked electronic coin data sets $Z_i$. The individual operations and their check results, i.e. the intermediate results of a processing operation, are recorded in coin register 4.

The processes "create" and "return", which concern the existence of the monetary amount $v_i$ per se, i.e. mean the creation and destruction of money, require an additional authorisation by the issuing entity 1 to be registered (i.e. logged) in the coin register 4. The other processing operations (splitting, merging, switching) do not require authorisation by issuing entity 1 or by the command initiator (=payer, e.g. the terminal or the security element).

A registration of the respective processing in the coin register 4 is realised, for example, by corresponding list entries in the database according to FIG. 7. Each list entry has further flags 25 to 28, which document the intermediate results of the respective processing, which must be performed by the coin register 4, and a status display 29, which the coin register 4 logs. Preferably, the flags 25 to 28 are used as an aid and are discarded by the coin register 4 after the commands have been completed. What remains are flags about the validity of the (masked) electronic coin data sets from columns 22a, 22b, 23a and/or 23b. These flags are in state "–" when a processing command is received, for example, and are set to state "1" after all checks have been successfully completed and are set to state "0" if at least one check has failed. A possible structure for a list entry of a coin data set comprises, for example, two columns 22a, 22b for a predecessor coin data set (O1, O2), two columns 23a, 23b for a successor coin data set (S1, S2), a signature column 24 for signatures of issuing entity(ies) 1 and signatures of terminals M, and four flag columns 25 to 28. Each of the entries in columns 25 to 28 has three alternative states "–" "1" or "0". Column 25 (O flag) indicates whether a validity check was successful with respect to an electronic coin data set in column 23a/b, wherein state "1" indicates that a validity check revealed that the electronic coin data set of column 23a/b is valid and state "0" indicates that a validity check revealed that the electronic coin data set of column 23a/b is invalid and state "–" indicates that a validity check is not yet completed. Column 26 (C flag) shows whether the calculation of the masked electronic coin data set was successful, wherein state "1" indicates that a calculation was successful and state "0" indicates that calculation was unsuccessful and the state "-" indicates that a validity check is not yet completed.

For example, the calculation to be performed in column 26 is:

$$(Z_{O1}+Z_{O2})-(Z_{S1}+Z_{S2})==0 \qquad (10).$$

Column 27 (R-flag) indicates whether a check of the range proofs or the range proof was successful, wherein state "1" indicates that a validity check showed that the range proofs or range proof could or could not be traced and state "0" indicates that a validity check showed that the range proofs or range proof could or could not be traced and state "-" indicates that a validity check has not yet been completed, was successful.

Column 28 (S flag) indicates whether a signature of the electronic coin data set matches the signature of column 24, wherein state "1" indicates that a validity check revealed that the signature could be identified as that of issuing entity 1 and state "0" indicates that a validity check revealed that the signature could not be identified as that of the issuing entity and the state "-" indicates that a validity check is not yet completed.

A change in the flags (also referred to as a "flag") requires approval by the coin register 4 and must then be stored unalterably in the coin register 4. A processing is final when and only when the required flags 25 to 28 have been validated by the coin register 4, i.e. changed from the "0" state to the "1" state or the "1" state after the appropriate check.

In order to determine whether a masked electronic coin data set Z is valid, the coin register 4 searches for the last change that concerns the masked electronic coin data set Z. It holds that the masked electronic coin data set Z is valid when and only when the masked electronic coin data set Z is listed for its last processing in one of the successor columns 23a, 23b and that last processing has the corresponding final flag 25 to 28. It also holds that the masked electronic coin data set Z is valid when and only when the masked electronic coin data set Z is listed for its last processing in one of the predecessor columns 22a, 22b and this last processing has failed, i.e. at least one of the corresponding required states of the flags 25 to 28 is set to "0".

It also holds that the masked electronic coin data set Z is not valid for all other events, for example, when the masked electronic coin data set Z is not found in the coin register 4 or when the last processing of the masked electronic coin data set Z is listed in one of the successor columns 23a, 23b but this last processing never became final or when the last processing of the masked electronic coin data set Z is in one of the predecessor columns 22a, 22b and this last processing is final.

The checks by the coin register 4 to see if a processing is final are represented by columns 25 to 28: The state in column 25 indicates whether the masked electronic coin data set(s) according to predecessor columns 22a, 22b are valid. The state in column 26 indicates whether the calculation of the masked electronic coin data set according to equation (10) is correct. The state in column 27 indicates whether the range checks for the masked electronic coin data set Z could be successfully verified. The state in column 28 indicates whether the signature in column 24 of the masked electronic coin data set Z is a valid signature of issuing entity 1.

For the modification "splitting", in the case of symmetrical splitting, it can be provided in column 24 to enter a signature generated by a terminal M1 to M3 or its SE in order to check or document the validity of a masked coin record.

The status "0" in a column 25 to 28 shows that the check was not successful. The status "1" in a column 25 to 28 shows that the check was successful. The status "-" in a column 25 to 28 shows that no check was carried out. The states can also have a different value, as long as a clear distinction can be made between success/failure of a check and it is evident whether a particular check was performed.

Column 29 is provided to record a status of the coin data set when transmitted directly between two SEs. The setting of the status occurs in the SE and is reported to the coin register 2, as shown in FIGS. 2 to 4. The status can have two states, inactive "0" and active "1", wherein an inactive coin data set is not usable for any transaction or action as it is already part of a transmission process 105.

As an example, five different processes are defined and explained in detail here. Reference is made to the corresponding list entry in FIG. 7.

For example, one processing is "create" an electronic coin data set C. Generating in the direct transaction layer 3 by the issuing entity 1 involves selecting a monetary amount $v_i$, creating an obfuscation amount $r_i$, as already described with equation (1). As shown in FIG. 7, no entries/flags are required in columns 22a, 22b, 23b and 25 to 27 or 29 during the "create" processing. The masked electronic coin data set $Z_i$ is registered in the successor column 23a. This registration is preferably done before transmitting it to a terminal M1 to M3 or its SE, in particular or already during generating by the issuing entity 1, wherein in both events equation (3) has to be executed for this purpose. The masked electronic coin data set $Z_i$ is signed by the issuing entity 1 when it is generated, this signature is entered in column 24 to ensure that the electronic coin data set $C_i$ has actually been generated by an issuing entity 1, wherein other procedures are also possible for this. If the signature of a received $Z_i$ matches the signature in column 24, the flag in column 28 is set (from "0" to "1"). The flags in columns 25 to 27 do not require a status change and can be ignored. The range proof is not needed because the coin register 4 trusts that issuing entity 1 will not issue negative monetary amounts. However, in an alternative embodiment, it can be sent by issuing entity 1 in the create command and checked by coin register 4. The status in column 29 is set to "active".

A processing is for example "Return". Returning, i.e. destroying money, causes the masked electronic coin data set $Z_i$ to become invalid after successful execution of the return command by issuing entity 1. This means that the returned (masked) electronic coin data set in coin register 4 can no longer be processed. To avoid confusion, the corresponding (non-masked) electronic coin data sets $C_i$ should be deleted in the direct transaction layer 3. When "returning", the predecessor column 22a is written to with the electronic coin data set $Z_i$, but no successor column 23a, 23b is occupied. The masked electronic coin data set $Z_i$ shall be checked at deactivation to ensure that the signature matches the signature according to column 24 to ensure that the electronic coin data set $C_i$ has indeed been created by an issuing entity 1, wherein again other means may be used for this check. If the signed $Z_i$ sent in the return command can be confirmed as signed by issuing entity 1, flag 28 is set (from "0" to "1"). The flags according to columns 26 to 27 do not require a status change and can be ignored. The flags according to column 25 and 28 are set after the corresponding check. The status according to 29 is set to inactive.

One processing is, for example, "splitting". Splitting, i.e. dividing an electronic coin data set $Z_i$ into a number n, for example 2, of electronic coin data subsets $Z_j$ and $Z_k$ is first carried out in the direct transaction layer 3, as still shown in FIGS. 8 and 10, wherein the monetary amounts $v_j$ and the obfuscation amount $r_j$ are generated. $v_k$ and $r_k$ are obtained from equations (7) and (8). In the coin register 4, flags 24 to 27 are set, the predecessor column 22a is described by the electronic coin data set $Z_i$, successor column 23a is described by $Z_j$ and successor column 23b is described by $Z_k$. The status changes required according to columns 24 to 27 are made after the corresponding check by the coin register 4 and document the respective check result. The flag according to column 28 is ignored. Column 24 is used to enter a signature generated by the dividing terminal M1 to M3 or its SE. The status in column 29 is (remains) set to "active".

For example, one processing is "merge". The merging, i.e. the joining of two electronic coin data sets $Z_i$ and $Z_j$ into one electronic coin data set $Z_m$ is first carried out in the direct transaction layer 3, as still shown in FIG. 10, wherein the monetary amount $v_m$ and the obfuscation amount $r_m$ are calculated. In the coin register 4, the flags 25 to 27 are set, the predecessor column 22a is described with the electronic coin data set $Z_i$, predecessor column 22b is described with 4 and successor column 23b is described with $Z_m$. The flags in columns 25 to 27 require status changes and the coin register 2 performs the appropriate checks. A range proof must be made to show that no new money has been generated. The flag according to column 28 is ignored. Column 24 is used to enter a signature generated by the merging terminal M1 to M3 or its SE. The status in column 29 is (remains) set to "active".

For example, one processing is "Switching". Switching is suggested when an electronic coin data set has been transmitted to another terminal Mx or its SEx. Switching, also called "switch", exchanges the electronic coin data set $C_k$ received from the first terminal M1 or SE1 for a new electronic coin data set $C_l$ with the same monetary amount. The new electronic coin data set $C_l$ is generated by the second terminal M2 or SE2. This switching is another way to invalidate (make invalid) the electronic coin data set $C_k$ received from the first terminal M1 or SE1, thereby avoiding re-issuing the same electronic coin data set $C_k$. The switching is done, for example, by adding a new obfuscation amount $r_{add}$ to the obfuscation amount $r_k$ of the received electronic coin data set $C_k$, thereby obtaining an obfuscation amount $r_l$ that only the second terminal M2 or the SE2 knows. This can also be done in the coin register 4. In order to prove that only a new obfuscation amount $r_{add}$ has been added to the obfuscation amount $r_k$ of the masked received electronic coin data set $Z_k$, but the monetary amount has remained the same, and thus equation (11):

$$v_k = v_l \qquad (11)$$

holds, the second terminal M2 or the SE2 must be able to prove that $Z_l - Z_k$ can be represented as a scalar multiple of G, i.e. as $r_{add}*G$. This means that only one obfuscation amount $r_{add}$ has been generated and the monetary amount of $Z_l$ is equal to the monetary amount of $Z_k$, i.e. $Z_l - Z_k = r_{add}*G$. This is done by generating a signature with the public key $Z_l - Z_k = r_{add}*G$.

The "splitting" and "merging" modifications to an electronic coin data set can also be delegated from a terminal M1 or SE1 to another terminal M2, M3 or SE2, SE3 respectively, for example when a communication link to the coin register 4 is not available.

FIG. 8 shows an embodiment example of a payment system according to the invention for the actions of "splitting", "merging" and "switching" electronic coin data sets C. In FIG. 8, the first terminal M1 or SE1 has received the coin data set $C_i$ and now wishes to perform a payment transaction not with the entire monetary amount $v_i$, but only with a partial amount $v_k$. For this purpose, the coin data set $C_i$ is divided. To do this, the monetary amount is first divided:

$$v_i = v_j + v_k \qquad (12)$$

Each of the received amounts $v_j$, $v_k$ must be greater than 0, because negative monetary amounts are not permitted.

In a preferred embodiment, the monetary amount $v_i$ is divided symmetrically into a number n of equally sized partial monetary amounts $v_j$.

$$v_j = v_i/n \qquad (12a)$$

The number n is an integer greater than or equal to two. For example, a monetary amount of 10 units can be divided into 2 partial amounts of 5 units (n=2) or into 5 partial amounts of 2 units each (n=5) or 10 partial amounts of one unit each (n=10).

In addition, new obfuscation amounts are derived:

$$r_i = r_j + r_k \qquad (13)$$

When symmetrically split, an individual unique obfuscation amount $r_j$ is formed in the terminal M1 or the SE1 for each partial coin amount, wherein the sum of the number n of obfuscation amounts $r_j$ of the coin data subsets is equal to the obfuscation amount $r_i$ of the split coin data set:

$$r_i = \Sigma_{k=1}^n r_{j\_k} \qquad (13a)$$

In particular, the last partial obfuscation amount $r_{j\_n}$ is equal to the difference between the obfuscation amount $r_i$ and the sum of the remaining partial obfuscation amounts:

$$r_{j\_n} = r_i - \Sigma_{k=1}^{n-1} r_{j\_k} \qquad (13b)$$

In this way, the obfuscation amounts $r_{j\_1}$ to $r_{j\_n-1}$ can be chosen arbitrarily and the rule of equation (13a) is satisfied by calculating the "last" individual obfuscation amount $r_{j\_n}$ accordingly.

For asymmetric splitting, masked coin data sets $Z_j$ and $Z_k$ are obtained from the coin data sets $C_j$ and $C_k$ according to equation (3) and registered in the coin register 4. For splitting, the predecessor column 22a is written with coin data set $Z_i$, the successor column 23a is written with $Z_j$ and the successor column 23b is written with $Z_k$. Additional information for the range proof (zero-knowledge-proof) is to be generated. The flags in columns 25 to 27 require status change and the coin register 4 performs the corresponding checks. The flags according to column 28 and the status according to column 29 are ignored.

In the case of symmetrical splitting, a signature is calculated in the respective terminal or SE. For this purpose, the following signature key sig is used for the k-th coin data subset $$\text{sig} = r_i - n \, r_{j\_k} \qquad (13c)$$

Therein n is the number of symmetrically split coin data subsets. In the case of symmetrical splitting, the signature of the k-th coin data subset $C_{j\_k}$ can be verified according to (13c) with the following verification key Sig:

$$\text{Sig} = Z_i - n \, Z_{j\_k} \qquad (13d)$$

Therein $Z_{j\_k}$ is the masked k-th coin data subset and n is the number of symmetrically split coin data subsets. This simplification results from the relationship with equation (3):

$$Z_{i\_n} Z_{j\_k} = (v_{i\_n} v_{j\_k})H + (r_{i\_n} r_{j\_k})G \qquad (13e)$$

wherein due to the symmetry properties of the division:

$$(v_{i\_n} v_{j\_k})H = 0 \qquad (13f)$$

so that equation 13e is simplified to:

$$Z_{i\_n} Z_{j\_k} = (r_{i\_n} r_{j\_k})G \qquad (13g)$$

The simplification due to equation 13f makes it possible to completely dispense with zero-knowledge proofs, whereby the application of symmetrical splitting saves enormous computing power and data volume.

Then, a coin data subset, in this case $C_k$ is transmitted from the first terminal M1 or SE1 to the second terminal M2 or SE2. In order to prevent double spending, a switching operation is useful to exchange the electronic coin data set $C_k$ received from the first terminal M1 or SE1 for a new electronic coin data set $C_l$ with the same monetary amount. The new electronic coin data set $C_l$ is generated by the second terminal M2 or SE2. The monetary amount of the coin data set $C_l$ is adopted and not changed, see equation (11).

Then, according to equation (14), a new obfuscation amount $r_{add}$ is added to the obfuscation amount $r_k$ of the received electronic coin data set $C_k$, $$r_l = r_k + r_{add} \qquad (14)$$

thereby obtaining an obfuscation amount $r_l$ known only to the second terminal M2. To prove that only a new obfuscation amount $r_{add}$ has been added to the obfuscation amount $r_k$ of the received electronic coin data set $Z_k$, but that the monetary amount has remained the same ($v_k = v_l$), the second terminal M2 must be able to prove that $Z_l - Z_k$ can be represented as a multiple of G. This is done by means of public signature $R_{add}$ according to equation (15):

$$R_{add} = r_{add} G$$

$$= Z_l - Z_k = (v_l - v_k)*H + (r_k + r_{add} - r_k)*G \qquad (15)$$

where G is the generator point of the ECC. Then the coin data set $C_l$ to be switched is masked using equation (3) to obtain the masked coin data set $Z_l$. In the coin register 4, the private signature $r_{add}$ can then be used to sign, for example, the masked electronic coin data set $Z_l$ to be switched, which is considered as a proof that the second terminal M2 or SE2 has only added an obfuscation amount $r_{add}$ to the masked electronic coin data set and no additional monetary value, i.e. $v_l = v_k$.

The proof is as follows:

$$Z_k = v_k \cdot H + r_k \cdot G$$

$$Z_l = v_l \cdot H + r_l \cdot G = v_k \cdot H + (r_k + r_{add}) \cdot G$$

$$Z_l - Z_k = (r_k | r_{add} - r_k) \cdot G$$

$$= r_{add} \cdot G \qquad (16).$$

Figure 9:
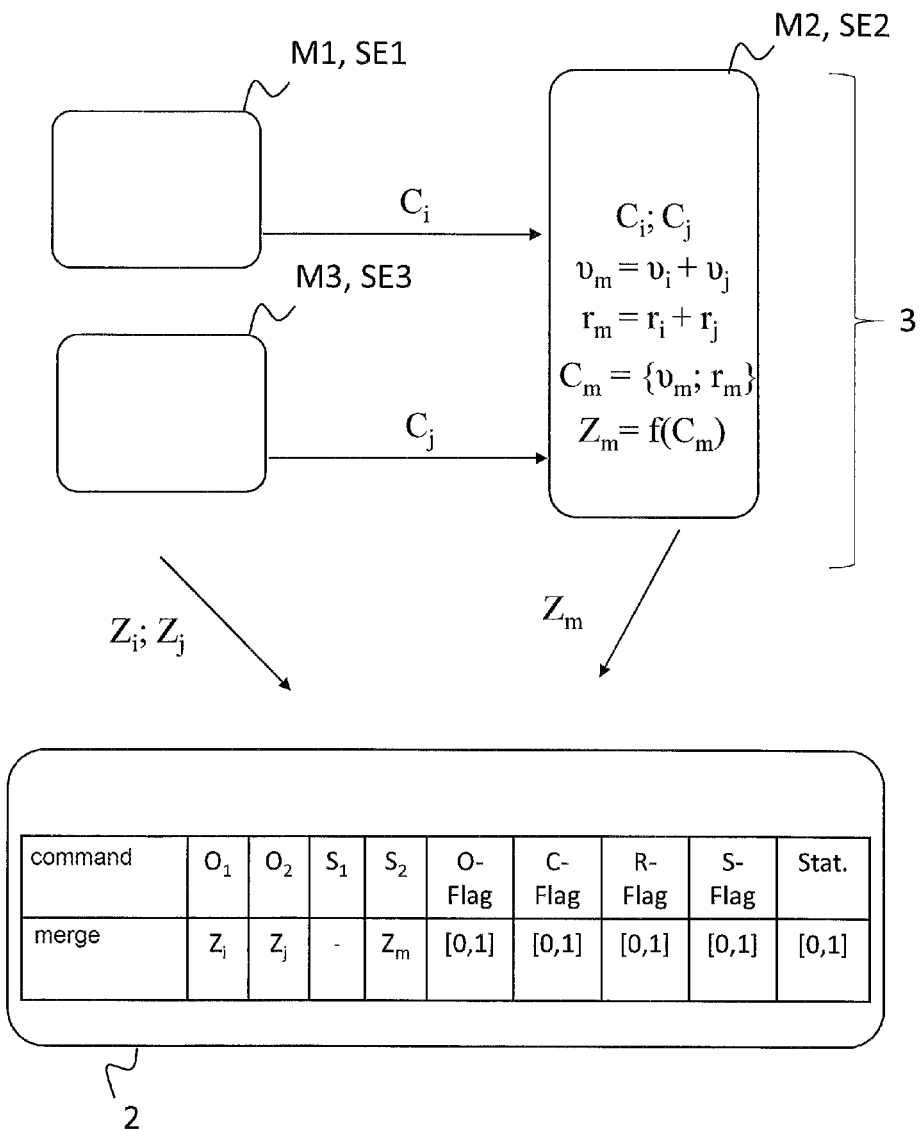
FIG. 9 an embodiment of a payment system according to the invention for merging electronic coin data sets.

FIG. 9 shows an embodiment of a payment system according to the invention for merging (also called combining) electronic coin data sets. In this case, the two coin data sets $C_i$ and $C_j$ are received in the second terminal M2 or SE2. Similar to the splitting according to FIG. 8, a new coin data set $Z_m$ is now obtained by adding both the monetary amounts and the obfuscation amount of the two coin data sets $C_i$ and $C_j$. Then the obtained coin data set $C_m$ to be merged is masked and the masked coin data set $Z_m$ is registered in the coin register 4. Then, the signature of the second terminal M2 or SE2 is entered during the "merging", as it has received the coin data set $C_i$ and $C_j$.

When combined by the payment system 2, the highest of the two individual check values of the respective electronic coin data subsets $C_i$ and $C_j$ is determined. This highest check value is adopted as the check value $C_i$ and $C_j$ of the combined electronic coin data set.

Alternatively, when combining (=merging) by a payment system 2, a new check value is determined from the sum of all check values of the electronic coin data subsets $C_i$ and $C_j$ divided by the product of the number (here two) of coin data subsets $C_i$ and $C_j$ with a constant correction value. The correction value is constant throughout the payment system. The correction value is greater than or equal to 1. Preferably, the correction value is dependent on a maximum deviation of the individual check values of the electronic coin data subsets $C_i$ and $C_j$ or on a maximum check value of one of the electronic coin data subsets $C_i$ and $C_j$. Further preferably, the correction value is less than or equal to 2. This new check value is adopted as the check value of the combined electronic coin data set $C_m$.

In the following, FIGS. 10 and 11 are described together to explain the actions of "creating", "transmitting", "switching", "merging" and "splitting". In the optional steps 101 and 102, a coin data set is requested and provided by the issuing entity 1 to the first terminal M1 or SE1 after the electronic coin data set is created. A masked electronic coin data set is sent to the coin register 4. In step 103, masking of the received electronic coin data set $C_i$ is performed according to equation (3). Then, in step 104, the masked electronic coin data set $Z_i$ is registered in the coin register 4. Optionally, the terminal M1 or SE1 can switch the received electronic coin data set. In step 105, the coin data set $C_i$ is transmitted in the direct transaction layer 3 to the second terminal M2 or SE2 according to the method of FIGS. 2 to 4. In the optional steps 106 and 107, a validity check with prior masking is performed, in which, in the good case, the coin register 4 confirms the validity of the coin data set $Z_i$ or $C_i$.

In step 108, a received coin data set $C_k$ (of course, the received coin data set $C_i$ could also be switched) is switched to a new coin data set $C_l$, which invalidates the coin data set $C_k$ and prevents double spending. To do this, the monetary amount $v_k$ of the transmitted coin data set $C_k$ is used as the "new" monetary amount $v_l$. In addition, as already explained with equations (14) to (17), the obfuscation amount $r_l$ is created. The additional obfuscation amount $r_{add}$ is used to prove that no new money (in the form of a higher monetary amount) was generated by the second terminal M2 or SE2. Then the masked coin data set $Z_l$ to be switched is sent to the coin register 4 and the switching from $C_k$ to $C_l$ is instructed.

In step 108', the corresponding check is made in coin register 4. $Z_k$ is entered in column 22a according to the table in FIG. 2 and the coin data set $Z_l$ to be switched is entered in column 23b. A check is then made in coin register 4 as to whether $Z_k$ is (still) valid, i.e. whether the last processing of $Z_k$ is entered in one of the columns 23a/b (as proof that $Z_k$ has not been further split or returned or merged) and whether a check for the last processing has failed. In addition, $Z_l$ is entered in column 23b and the flags in columns 25, 26, 27 are initially set to "0". Now a check is made whether $Z_l$ is valid, wherein the check according to equations (16) and (17) can be used. In a good case, the flag in column 25 is set to "1", otherwise to "0". Now a check is made, the calculation according to equation (10) shows that $Z_k$ and $Z_l$ are valid and the flag in column 26 is set accordingly. Furthermore, it is checked whether the ranges are conclusive, then the flag is set in column 27. When all checks have been successful and this has been unalterably recorded in the coin register 4, the coin data set is considered to be switched. I.e. the coin data set $C_k$ is no longer valid and from now on the coin data set $C_i$ is valid.

In step 109, two coin data sets $C_k$ and $C_i$ are merged to a new coin data set $C_m$, whereby the coin data sets $C_k$, $C_i$ become invalid and double spending is prevented. For this purpose, the monetary amount $v_m$ is formed from the two monetary amounts $v_k$ and $v_i$. For this purpose, the obfuscation amount $r_m$ is formed from the two obfuscation amounts $r_k$ and $r_i$. In addition, by means of equation (3), the masked coin data set $Z_m$ to be connected is obtained and this is sent (together with other information) to the coin register 2 and the merging is requested as processing. In addition, a signature $S_k$ and a signature $S_i$ are generated and communicated to the coin register 2.

In step 109' the corresponding check is made in the coin register 4. Therein $Z_m$ is entered in column 23b according to the table in FIG. 2, which is also the same as a switching. A check is then made in coin register 4 as to whether $Z_k$ and $Z_i$ are (still) valid, i.e. whether the last processing of $Z_k$ or $Z_i$ is entered in one of the columns 23a/b (as proof that $Z_k$ and $Z_i$ have not been further split or deactivated or merged) and whether a check for the last processing has failed. In addition, the flags in columns 25, 26, 27 are initially set to "0". Now a check is made whether $Z_m$ is valid, wherein the check according to equations (16) and (17) can be used. In the good case, the flag in column 25 is set to "1", otherwise to "0". Now a check is made, the calculation according to equation (10) shows that $Z_i$ plus $Z_k$ equals $Z_m$ and accordingly the flag in column 26 is set. Furthermore, it is checked whether the ranges are conclusive, then the flag is set in column 27.

In step 110, a coin data set $C_i$ is split asymmetrically into two coin data subsets $C_k$ and $C_j$, whereby the coin data set $C_i$ is invalidated and the two asymmetrically split coin data subsets $C_k$ and $C_j$ are to be validated. In an asymmetric split, the monetary amount $v_i$ is split into partial monetary amounts $v_k$ and $v_j$ of different sizes. For this purpose, the obfuscation amount $r_i$ is divided into the two obfuscation amounts $r_k$ and $r_j$. In addition, by means of equation (3), the masked coin data subsets $Z_k$ and $Z_j$ are obtained and sent to the coin register 4 with further information, for example the range checks (zero-knowledge-proofs), and the splitting is requested as processing.

In step 110', the corresponding check is carried out in coin register 4. $Z_j$ and $Z_k$ are entered in columns 23a/b according to the table in FIG. 2. A check is then made in coin register 4 as to whether $Z_i$ is (still) valid, i.e. whether the last processing of $Z_i$ is entered in one of the columns 23a/b (as proof that $Z_i$ has not been further split or deactivated or merged) and whether a check for the last processing has failed. In addition, the flags in columns 25, 26, 27 are initially set to "0". Now a check is made whether $Z_j$ and $Z_k$ are valid, wherein the check according to equations (16) and (17) can be used. In a good case, the flag in column 25 is set to "1". Now a check is made, the calculation according to equation (10) shows that $Z_i$ is equal to $Z_k$ plus $Z_j$ and accordingly the flag in column 26 is set. Furthermore, it is checked whether the ranges are conclusive, then the flag is set in column 27.

Figure 12:
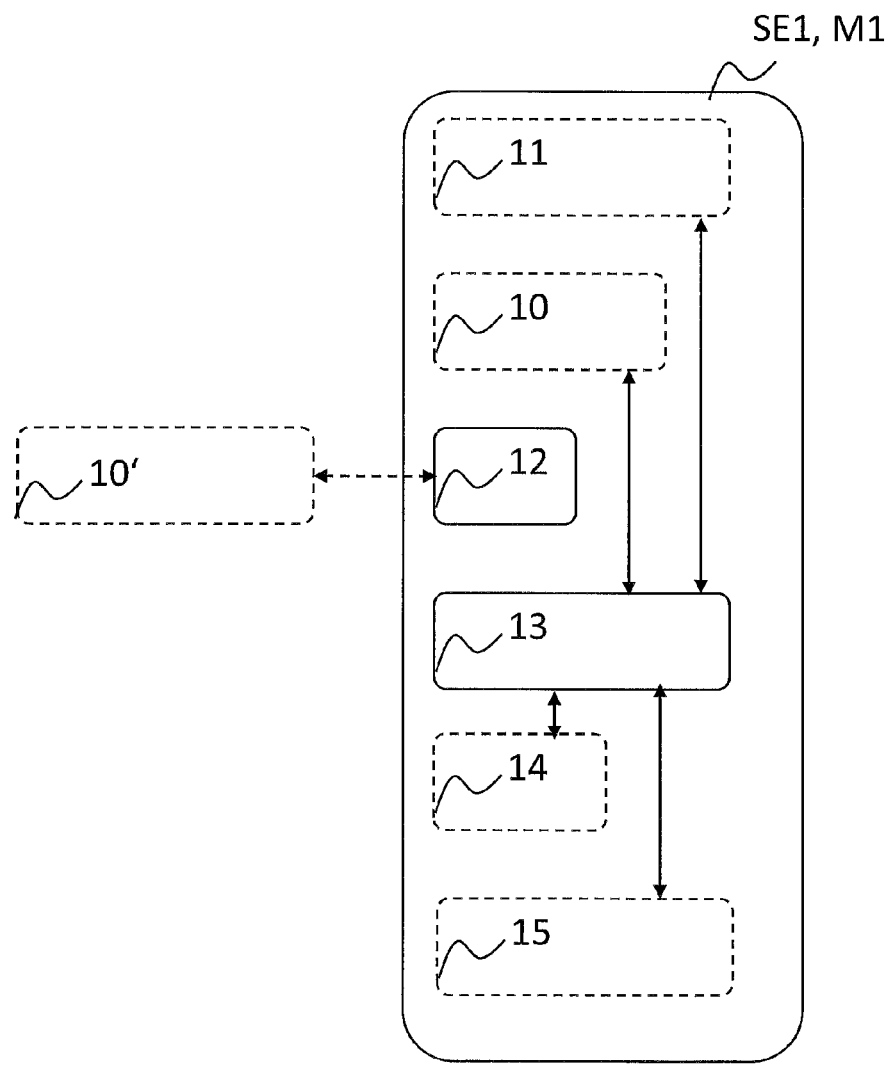
FIG. 12 an embodiment of a security element according to the invention.

FIG. 12 is an embodiment of a device M1 according to the invention in which the SE1 is inserted. The device M1 can store electronic coin data sets $C_i$ in a data memory 10, 10'.

In this regard, the electronic coin data sets $C_i$ may reside on the data memory 10 of the device M1 or may be available in an external data memory 10'. When using an external data memory 10', the electronic coin data sets $C_i$ could be stored in an online memory, for example a data memory 10' of a digital wallet provider. Additionally, private data memory, for example a network attached storage, NAS in a private network could also be used.

In one event, the electronic coin data set $C_i$ is shown as a hard copy printout. In this case, the electronic coin data set may be represented by a QR code, an image of a QR code, or may be a file or a string of characters (ASCII).

The device M1 has at least one interface 12 available as a communication channel for outputting the coin data set $C_i$. This interface 12 is for example an optical interface, for example for displaying the coin data set $C_i$ on a display unit (display), or a printer for printing out the electronic coin data set $C_i$ as a paper printout. This interface 12 can also be a digital communication interface, for example for near field communication, such as NFC, Bluetooth, or an internet-enabled interface, such as TCP, IP, UDP, HTTP or an access to a smart card as a security element. For example, this interface 12 is a data interface so that the coin data set $C_i$ is transmitted between devices via an application, such as an instant messenger service, or as a file or string.

Furthermore, the interface 12 or another interface (not shown) of the device M1 is arranged to interact with the coin register 4. The device M1 is preferably online capable for this purpose.

Furthermore, the device M1 may also have an interface for the receipt of electronic coin data sets. This interface is arranged to receive visually presented coin data sets, for example by means of a capture module such as a camera or scanner, or digitally presented coin data sets, received via NFC, Bluetooth, TCP, IP, UDP, HTTP or coin data sets presented by means of an application.

The device M1 also comprises a computing unit 13 capable of performing the coin data set masking method and coin data set processing described above.

The device M1 is online capable and can preferably detect when it is connected to a network, such as WLAN, by means of a location detection module 15. Optionally, a specific network can be flagged as preferred (=location zone) so that the device M1 only performs special functions when it is logged into this network. Alternatively, the location detection module 15 detects when the device M1 is in predefined GPS coordinates including a defined radius and performs the special functions according to the location zone thus defined. This location zone can be introduced either manually into the device M1 or via other units/modules into the device M1. The special functions that the device M1 performs when the location zone is detected are, in particular, the transmitting of electronic coin data sets from/to the external data memory 10 from/to a vault module 14 and, if applicable, the transmitting of masked coin data sets Z to the coin register 4, for example as part of the above-mentioned processing on a coin data set.

In the simplest case, all coin data sets $C_i$ are automatically connected to a coin data set in the terminal M1 after receipt (see merging-processing or connect-step). That is, as soon as a new electronic coin data set is received, a connect or switch command is sent to the coin register 4. The device M1 can also prepare electronic coin data sets in algorithmically defined denominations and store them in the data memory 10, 10' so that a payment process is possible even without a data connection to the coin register 4.

FIG. 13 shows an overall system for better understanding. The overall system according to the invention comprises an issuing entity (central bank) 1a. In addition, further issuing entities 1b, 1c may be provided, for example issuing electronic coin data sets in another currency. In addition, at least one payment system 2 is shown in which at least one coin register 4 is provided as the central manager of the payment system. Moreover, a plurality of subscribers represented as terminals Mx (with respective SEx) is provided. The payment system 2 comprises, for example, commercial banks and one (or more) central coin register 4, which performs the registration of the coin data sets $C_i$ and checks and logs the modifications to the coin data set $C_i$.

The terminals M1 to M6 can directly exchange coin data sets $C_i$ in the direct transaction layer 3. For example, terminal M5 transmits a coin data set to terminal M4. For example, terminal M4 transmits the coin data set to terminal M3. For example, terminal M6 transmits a coin data set to terminal M1. In each sending terminal Mx or each receiving terminal Mx, the check value of the coin data set to be sent or received is used to check whether the coin data set is indicated to the payment system and/or whether the coin data set is to be returned to the issuing entity 1a, see FIGS. 2 to 4. For example, the payment system 2 uses the check value or a counter value derived from the check value for each coin data set to check whether the coin data set is to be returned or not, see FIG. 5 for further details.

In FIG. 13, a coin data set is transmitted from the terminal M1 to the terminal M2 via the payment system 2 (indirect passing on), as described in FIGS. 2 to 4 (step 105).

Within the scope of the invention, all elements described and/or drawn and/or claimed may be combined with each other as desired.

The invention claimed is:

1. A method in a first security element for transmitting an electronic coin data set to a second security element,
   wherein the electronic coin data set is registered in a coin register of a payment system, comprising the method steps of:
   setting a status of the electronic coin data set from the first security element to an inactive status,
   sending the electronic coin data set from the first security element to the second security element,
   checking whether a receipt confirmation has been received from the second security element in the first security element; and
   deleting the sent electronic coin data set when the checking step determines that the receipt confirmation was received from the first security element,
   wherein a transaction data set relating to the sent electronic coin data set is stored in the first security element,
   wherein in a transmission error case the electronic coin data set is resent based on the stored transaction data set.

2. The method according to claim 1, wherein at least one of said security elements is operationally inserted into a device.

3. The method according to claim 1, wherein the setting of the status occurs immediately before or after the sending step.

4. The method according to claim 1, wherein the electronic coin data set is sent cryptographically secured.

5. The method according to claim 1, wherein the transaction data set has at least:
   a transaction number,
   an identifier or address of the first security element,
   an identifier or address of the second security element, and
   an amount of the electronic coin data set.

6. The method according to claim 1, wherein after the deleting step a successful transmission is indicated in the first security element.

7. The method according to claim 6, wherein in the indication step the electronic coin data set is evaluated as an input parameter of an application of a terminal containing the first security element.

8. The method according to claim 1, wherein the first security element indicates to the second security element, or the coin register the deletion of the sent coin data set after the deletion step.

9. The method according to claim 1, wherein the second security element sets a status of the electronic coin data set to an active status after the deletion step.

10. The method according to claim 1, wherein in a transmission error case a status of the sent electronic coin data set in the first security element is reset to an active status.

11. The method according to claim 1, wherein in a transmission error case, the first security element queries a status of the sent electronic coin data set from the coin register and:
   in the event that the sent electronic coin data set is registered to the first security element, resets a status of the sent coin data set in the first security element by the first security element to an active status; and
   in the event the sent electronic coin data set is not registered to the first security element, reporting a transaction error to the coin register by the first security element.

12. The method according to claim 1, wherein in a transmission error case, the second security element queries a status of the sent electronic coin data set from the coin register and:
   in the event the sent electronic coin data set is registered to the first security element, deleting the sent coin data set in the second security element by the second security element; and
   in the event the sent electronic coin data set is not registered to the first security element, reporting a transaction error to the coin register by the second security element.

13. The method according to claim 1, wherein, in the event of not receiving the receipt confirmation, the first security element re-registers the sent coin data set in the coin register.

14. A security element having:
   a computing unit arranged to transmit electronic coin data sets according to a method of claim 1, wherein the security element is provided as the first security element of the method,
   the computing unit connected with a data memory,
   wherein at least one electronic coin data set is stored in the data memory; and
   an interface arranged to output the at least one electronic coin data set to another security element.

15. A terminal with the security element according to claim 14, wherein the interface is arranged to output the at least one electronic coin data set to the other security element via an interface of the terminal.

16. A payment system having a coin register, at least one terminal according to claim 15 and an issuing entity adapted to create an electronic coin data set for the payment system, wherein the first security element is arranged in the terminal for executing the method.

17. A coin register for a payment system,
wherein the coin register is arranged to register electronic coin data sets according to the method of claim 1.

18. A method in a first security element for transmitting an electronic coin data set to a second security element,
wherein the electronic coin data set is registered in a coin register of a payment system, comprising the method steps of:
setting a status of the electronic coin data set from the first security element to an inactive status,
sending the electronic coin data set from the first security element to the second security element,
checking whether a receipt confirmation has been received from the second security element in the first security element; and
deleting the sent electronic coin data set when the checking step determines that the receipt confirmation was received from the first security element,
wherein in a transmission error case a status of the sent electronic coin data set in the first security element is reset to an active status.

19. A method in a first security element for transmitting an electronic coin data set to a second security element,
wherein the electronic coin data set is registered in a coin register of a payment system, comprising the method steps of:
setting a status of the electronic coin data set from the first security element to an inactive status,
sending the electronic coin data set from the first security element to the second security element,
checking whether a receipt confirmation has been received from the second security element in the first security element; and
deleting the sent electronic coin data set when the checking step determines that the receipt confirmation was received from the first security element,
wherein, in the event of not receiving the receipt confirmation, the first security element re-registers the sent coin data set in the coin register.

* * * * *